US012214229B2

(12) United States Patent
Kim et al.

(10) Patent No.: US 12,214,229 B2
(45) Date of Patent: Feb. 4, 2025

(54) MASK APPARATUS

(71) Applicant: LG Electronics Inc., Seoul (KR)

(72) Inventors: Taejun Kim, Seoul (KR); Jeongtaek Park, Seoul (KR); Hojung Kim, Seoul (KR); Seokho Choi, Seoul (KR); Keonwang Lee, Seoul (KR); Chiyoung Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 879 days.

(21) Appl. No.: 17/231,465

(22) Filed: Apr. 15, 2021

(65) Prior Publication Data

US 2021/0379418 A1 Dec. 9, 2021

(30) Foreign Application Priority Data

Jun. 5, 2020 (KR) ........................ 10-2020-0068407

(51) Int. Cl.

*A62B 18/02* (2006.01)
*A62B 7/10* (2006.01)
*A62B 9/00* (2006.01)
*A62B 18/00* (2006.01)
*A62B 18/08* (2006.01)

(52) U.S. Cl.

CPC .............. *A62B 18/006* (2013.01); *A62B 7/10* (2013.01); *A62B 9/00* (2013.01); *A62B 18/025* (2013.01); *A62B 18/08* (2013.01)

(58) Field of Classification Search

CPC ..... A62B 18/006; A62B 18/025; A62B 18/08; A62B 7/10; A62B 9/00

See application file for complete search history.

(56) References Cited

U.S. PATENT DOCUMENTS 4,546,793 A 10/1985 Stupecky
4,646,732 A 3/1987 Chien
5,062,421 A 11/1991 Burns et al.
5,372,130 A 12/1994 Stern et al.
5,782,234 A 7/1998 Bates
(Continued)

FOREIGN PATENT DOCUMENTS

CN 1455270 11/2003
CN 103505788 1/2014
(Continued)

OTHER PUBLICATIONS

Extended European Search Report in European Appln. No. 20217535.2, dated Jun. 22, 2021, 4 pages.
(Continued)

*Primary Examiner* — Timothy A Stanis
(74) *Attorney, Agent, or Firm* — Fish & Richardson P.C.

(57) ABSTRACT

A mask apparatus includes a mask body, a seal disposed at a rear surface of the mask body, a fan module disposed at a front surface of the mask body, and a mask body cover that covers the fan module and is coupled to the front surface of the mask body. The mask body includes an air duct configured to guide external air from the fan module to a breathing space inside the seal, and an air exhaust hole configured to discharge air exhaled into the breathing space to an outside of the mask body. An area of a duct outlet of the air duct is greater than an area of a duct inlet of the air duct.

19 Claims, 13 Drawing Sheets

(56) References Cited

U.S. PATENT DOCUMENTS

| | | | | |
|---|---|---|---|---|
| 6,213,119 | B1 | 4/2001 | Brydon et al. | |
| 6,435,184 | B1 * | 8/2002 | Ho | A62B 23/02 128/206.28 |
| 6,543,450 | B1 | 4/2003 | Flynn | |
| 8,667,959 | B2 | 3/2014 | Tilley et al. | |
| 10,226,542 | B2 | 3/2019 | Messina et al. | |
| 10,342,999 | B2 | 7/2019 | Song et al. | |
| 10,661,104 | B2 | 5/2020 | Morgan et al. | |
| 11,241,594 | B2 | 2/2022 | Szasz et al. | |
| 2003/0052279 | A1 | 3/2003 | Kikuchi | |
| 2003/0066257 | A1 | 4/2003 | Shovlin | |
| 2003/0066527 | A1 | 4/2003 | Chen | |
| 2005/0145249 | A1 | 7/2005 | Solyntjes et al. | |
| 2006/0076012 | A1 | 4/2006 | Tanizawa et al. | |
| 2007/0125385 | A1 | 6/2007 | Ho et al. | |
| 2009/0320847 | A1 | 12/2009 | Bozanic et al. | |
| 2010/0101575 | A1 | 4/2010 | Fedorko et al. | |
| 2010/0224190 | A1 | 9/2010 | Tilley et al. | |
| 2010/0313892 | A1 | 12/2010 | Shigematsu et al. | |
| 2010/0329924 | A1 | 12/2010 | Harris | |
| 2011/0126713 | A1 | 6/2011 | Legare et al. | |
| 2014/0216475 | A1 | 8/2014 | Blomberg et al. | |
| 2014/0360501 | A1 | 12/2014 | Guiducci et al. | |
| 2015/0034080 | A1 | 2/2015 | Furuichi et al. | |
| 2015/0047642 | A1 | 2/2015 | Tucker et al. | |
| 2015/0136142 | A1 | 5/2015 | Blomberg | |
| 2015/0151143 | A1 | 6/2015 | Langford | |
| 2015/0202473 | A1 | 7/2015 | Curran et al. | |
| 2015/0217144 | A1 | 8/2015 | Skov et al. | |
| 2015/0217146 | A1 | 8/2015 | Skov et al. | |
| 2015/0250915 | A1 | 9/2015 | Pugh et al. | |
| 2015/0289598 | A1 | 10/2015 | Hsiung | |
| 2015/0306324 | A1 | 10/2015 | Ayon et al. | |
| 2015/0362478 | A1 | 12/2015 | Phillips | |
| 2016/0001111 | A1 | 1/2016 | Morgan et al. | |
| 2016/0022944 | A1 | 1/2016 | Chodkowski et al. | |
| 2016/0030778 | A1 | 2/2016 | Skov et al. | |
| 2016/0030779 | A1 | 2/2016 | Twu et al. | |
| 2016/0074604 | A1 | 3/2016 | Bronner et al. | |
| 2016/0236016 | A1 | 8/2016 | Ono et al. | |
| 2016/0279450 | A1 | 9/2016 | Goldstein et al. | |
| 2017/0136271 | A1 | 5/2017 | Munster | |
| 2017/0157353 | A1 | 6/2017 | Olsen et al. | |
| 2018/0078798 | A1 | 3/2018 | Fabian et al. | |
| 2018/0177965 | A1 | 6/2018 | Patel | |
| 2018/0185677 | A1 | 7/2018 | Curran et al. | |
| 2018/0236275 | A1 * | 8/2018 | Song | A62B 18/10 |
| 2018/0318457 | A1 | 11/2018 | Lucio | |
| 2019/0009114 | A1 | 1/2019 | Han | |
| 2019/0113501 | A1 | 4/2019 | Jameson et al. | |
| 2019/0160249 | A1 | 5/2019 | Rose et al. | |
| 2019/0175962 | A1 | 6/2019 | Su et al. | |
| 2019/0275357 | A1 | 9/2019 | Palmer, Jr. et al. | |
| 2020/0008539 | A1 | 1/2020 | Kolasa | |
| 2020/0038614 | A1 | 2/2020 | Duff et al. | |
| 2020/0086071 | A1 | 3/2020 | Lin et al. | |
| 2020/0087031 | A1 | 3/2020 | Yoo et al. | |
| 2020/0129650 | A1 | 4/2020 | Kim et al. | |
| 2020/0155877 | A1 | 5/2020 | Key et al. | |
| 2020/0206545 | A1 * | 7/2020 | Kim | A62B 18/025 |
| 2021/0093903 | A1 * | 4/2021 | Edwards | A62B 18/006 |
| 2021/0228920 | A1 | 7/2021 | Arigue et al. | |
| 2021/0330853 | A1 * | 10/2021 | Mizandari | A62B 7/10 |
| 2021/0337891 | A1 | 11/2021 | Shah et al. | |
| 2021/0378325 | A1 | 12/2021 | Mun et al. | |
| 2021/0379412 | A1 | 12/2021 | Lee et al. | |
| 2021/0402222 | A1 | 12/2021 | Kwon et al. | |
| 2022/0016449 | A1 | 1/2022 | Choi et al. | |

FOREIGN PATENT DOCUMENTS

| | | | |
|---|---|---|---|
| CN | 103751919 | | 4/2014 |
| CN | 104162236 | | 11/2014 |
| CN | 203943119 | | 11/2014 |
| CN | 104826247 | | 8/2015 |
| CN | 204637356 | | 9/2015 |
| CN | 105126219 | | 12/2015 |
| CN | 105167366 | | 12/2015 |
| CN | 105476118 | | 4/2016 |
| CN | 105495776 | | 4/2016 |
| CN | 105641821 | | 6/2016 |
| CN | 205285072 | | 6/2016 |
| CN | 106039607 | | 10/2016 |
| CN | 106235464 | | 12/2016 |
| CN | 106253937 | | 12/2016 |
| CN | 106730464 | | 5/2017 |
| CN | 106847663 | | 6/2017 |
| CN | 107149182 | | 9/2017 |
| CN | 206459266 | | 9/2017 |
| CN | 107224687 | | 10/2017 |
| CN | 206577264 | | 10/2017 |
| CN | 107308564 | | 11/2017 |
| CN | 107405508 | | 11/2017 |
| CN | 107735148 | | 2/2018 |
| CN | 206995630 | | 2/2018 |
| CN | 207011751 | | 2/2018 |
| CN | 207040968 | | 2/2018 |
| CN | 207041756 | | 2/2018 |
| CN | 207152901 | | 3/2018 |
| CN | 207604526 | | 7/2018 |
| CN | 207721249 | | 8/2018 |
| CN | 207836817 | | 9/2018 |
| CN | 108635689 | | 10/2018 |
| CN | 208145256 | | 11/2018 |
| CN | 109078277 | | 12/2018 |
| CN | 208403333 | | 1/2019 |
| CN | 208611622 | | 3/2019 |
| CN | 208694061 | | 4/2019 |
| CN | 109924568 | | 6/2019 |
| CN | 111135492 | | 5/2020 |
| CN | 111565763 | | 8/2020 |
| EP | 0558147 | | 9/1993 |
| EP | 0621056 | | 10/1994 |
| EP | 2913083 | | 9/2015 |
| EP | 3446755 | | 2/2019 |
| EP | 3446756 | | 2/2019 |
| EP | 3919132 | A1 | 12/2021 |
| GB | 1155046 | | 6/1969 |
| JP | H05137808 | | 6/1993 |
| JP | 3039303 | | 7/1997 |
| JP | H09225012 | | 9/1997 |
| JP | 10066817 | | 3/1998 |
| JP | H10165527 | | 6/1998 |
| JP | 3077655 | | 5/2001 |
| JP | 2003322712 | | 11/2003 |
| JP | 2004364177 | | 12/2004 |
| JP | 3117209 | U | 1/2006 |
| JP | 2007236600 | | 9/2007 |
| JP | 2011078604 | | 4/2011 |
| JP | 2011078678 | | 4/2011 |
| JP | 2011115449 | | 6/2011 |
| JP | 2012-075793 | | 4/2012 |
| JP | 2013127129 | | 6/2013 |
| JP | 3196218 | | 2/2015 |
| JP | 2015093036 | | 5/2015 |
| JP | 2015-524337 | | 8/2015 |
| JP | 2015527130 | | 9/2015 |
| JP | 2016087376 | | 5/2016 |
| JP | 2018000982 | | 1/2018 |
| JP | 2018033905 | | 3/2018 |
| JP | 2018089158 | | 6/2018 |
| JP | 2018-146805 | | 9/2018 |
| JP | 2019501721 | | 1/2019 |
| KR | 10-1995-0008732 | | 8/1995 |
| KR | 20050061384 | | 6/2005 |
| KR | 20100081991 | | 7/2010 |
| KR | 20-2010-0009804 | | 10/2010 |
| KR | 1020110067854 | | 6/2011 |
| KR | 20120051735 | | 5/2012 |
| KR | 200461294 | | 7/2012 |
| KR | 101228403 | | 1/2013 |
| KR | 101536265 | | 7/2015 |
| KR | 101554664 | | 9/2015 |

(56) References Cited

FOREIGN PATENT DOCUMENTS

| | | |
|---|---|---|
| KR | 101619487 | 5/2016 |
| KR | 20160062808 | 6/2016 |
| KR | 20160129562 | 11/2016 |
| KR | 20160132159 | 11/2016 |
| KR | 1020160129562 | 11/2016 |
| KR | 101733470 | 4/2017 |
| KR | 20170126163 | 11/2017 |
| KR | 20180009326 | 1/2018 |
| KR | 10-2018-0012496 | 2/2018 |
| KR | 101827016 | 2/2018 |
| KR | 1020180027561 | 3/2018 |
| KR | 101849610 | 4/2018 |
| KR | 20180043234 | 4/2018 |
| KR | 10-2018-0045934 | 5/2018 |
| KR | 20180045934 | 5/2018 |
| KR | 20180064284 | 6/2018 |
| KR | 20180091698 | 8/2018 |
| KR | 1020180092363 | 8/2018 |
| KR | 20180128040 | 11/2018 |
| KR | 10-2018-0130658 | 12/2018 |
| KR | 101925388 | 12/2018 |
| KR | 1020180135840 | 12/2018 |
| KR | 10-1942785 | 1/2019 |
| KR | 20190033299 | 3/2019 |
| KR | 1020190033299 | 3/2019 |
| KR | 10-2019-0053757 | 5/2019 |
| KR | 10-2019-0022668 | 6/2019 |
| KR | 102002878 | 7/2019 |
| KR | 1020190089188 | 7/2019 |
| KR | 1020190096496 | 8/2019 |
| KR | 102023974 | 9/2019 |
| KR | 10-2019-0119804 | 10/2019 |
| KR | 101997813 | 10/2019 |
| KR | 102065360 | 2/2020 |
| KR | 1020200033495 | 3/2020 |
| KR | 102110687 | 5/2020 |
| KR | 20200048502 | 5/2020 |
| KR | 1020200048502 | 5/2020 |
| KR | 1020200049490 | 5/2020 |
| KR | 1020200079925 | 7/2020 |
| TW | 201201879 | 1/2012 |
| TW | M555232 | 2/2018 |
| TW | 201904614 | 2/2019 |
| WO | WO 1996/22124 | 7/1996 |
| WO | WO2009067583 | 5/2009 |
| WO | WO2010070495 | 6/2010 |
| WO | WO2014020469 | 2/2014 |
| WO | WO 2016/072868 | 5/2016 |
| WO | WO2016157159 | 10/2016 |
| WO | WO20170004313 | 1/2017 |
| WO | WO2017116174 | 7/2017 |
| WO | WO2018036902 | 3/2018 |
| WO | WO2018147941 | 8/2018 |
| WO | WO 2019/059699 | 3/2019 |
| WO | WO2020055106 | 3/2020 |
| WO | WO2020094850 | 5/2020 |

OTHER PUBLICATIONS

Extended European Search Report in European Appln. No. 20217537.8, dated Jun. 22, 2021, 4 pages.
Office Action in Korean Appln. No. 10-2020-0068404, dated Jun. 30, 2021, 12 pages (with English translation).
Office Action in Korean Appln. No. 10-2020-0068611, dated Jun. 30, 2021, 12 pages (with English translation).
Office Action in Taiwanese Appln. No. 109146705, dated Jul. 7, 2021, 19 pages (with English translation).
Office Action in Taiwanese Appln. No. 110102539, dated Jul. 12, 2021, 10 pages (with English translation).
Office Action in Taiwanese Appln. No. 110102540, dated Jul. 12, 2021, 19 pages (with English translation).
Office Action in Taiwanese Appln. No. 110105039, dated Jul. 12, 2021, 15 pages (with English translation).
Office Action in U.S. Appl. No. 17/178,103, mailed on Jun. 30, 2023, 30 pages.
Office Action in Chinese Appln. No.202110096186.5, mailed on Feb. 9, 2024, 7 pages (with English translation).
Office Action in U.S. Appl. No. 17/121,056, mailed on Dec. 21, 2023, 10 pages.
Office Action in U.S. Appl. No. 17/121,115, mailed on Dec. 20, 2023, 11 pages.
Office Action in U.S. Appl. No. 17/174,766, mailed on Dec. 5, 2023, 12 pages.
Office Action in U.S. Appl. No. 17/231,462, mailed on Dec. 28, 2023, 17 pages.
Office Action in U.S. Appl. No. 17/231,472, mailed on Feb. 27, 2024, 20 pages.
Office Action in U.S. Appl. No. 17/244,683, mailed on Feb. 8, 2024, 14 pages.
Extended European Search Report in European Appln. No. 21169778.4, dated Oct. 15, 2021, 5 pages.
Extended European Search Report in European Appln. No. 21169793.3, dated Oct. 15, 2021, 4 pages.
Extended European Search Report in European Appln. No. 21169796.6, dated Oct. 18, 2021, 4 pages.
Extended European Search Report in European Appln. No. 21169813.9, dated Oct. 20, 2021, 4 pages.
Extended European Search Report in European Appln. No. 21169817.0, dated Oct. 14, 2021, 4 pages.
Extended European Search Report in European Appln. No. 21170476.2, dated Oct. 13, 2021, 4 pages.
Extended European Search Report in European Appln. No. 21170861.5, dated Oct. 25, 2021, 4 pages.
Office Action in Japanese Appln. No. 2020-204668, dated Feb. 7, 2022, 12 pages (with English translation).
Office Action in Korean Appln. No. 10-2020-0080437, dated Feb. 21, 2022, 13 pages (with English translation).
Office Action in Korean Appln. No. 10-2020-0068421, dated Jan. 23, 2022, 12 pages (with English translation).
Office Action in Taiwanese Appln. No. 11120021940, dated Dec. 20, 2020, 11 pages (with English translation).
Notice of Allowance in Korean Appln. No. 10-2020-0068407, dated Nov. 29, 2021, 4 pages (with English translation).
Office Action in Korean Appln. No. 10-2020-0068400, dated Dec. 27, 2021, 13 pages (with English translation).
Office Action in Korean Appln. No. 10-2020-0068412, dated Dec. 27, 2021, 15 pages (with English translation).
Office Action in Korean Appln. No. 10-2020-0080417, dated Dec. 28, 2021, 13 pages (with English translation).
Office Action in Korean Appln. No. 10-2020-0089132, dated Dec. 28, 2021, 13 pages (with English translation).
Office Action in Korean Appln. No. 10-2020-0068413, dated Nov. 17, 2021, 13 pages (with English translation).
Office Action in Korean Appln. No. 10-2020-0080087, dated Nov. 30, 2021, 15 pages (with English translation).
Office Action in Indian Appln. No. 202114007027, dated Jan. 5, 2022, 6 pages.
Office Action in Indian Appln. No. 202114003123, dated Jan. 6, 2022, 5 pages.
Office Action in Indian Appln. No. 202114008985, dated Jan. 12, 2022, 5 pages.
Office Action in Indian Appln. No. 202114003125, dated Jan. 13, 2022, 5 pages.
Office Action in Indian Appln. No. 202114007372, dated Jan. 24, 2022, 6 pages.
Notice of Allowance in U.S. Appl. No. 17/178,103, mailed on Nov. 3, 2023, 12 pages.
Office Action in Korean Appln. No. 10-2022-0126062, mailed on Sep. 26, 2023, 8 pages (with English translation).
Office Action in U.S. Appl. No. 17/112,500, mailed on Nov. 28, 2023, 14 pages.
Office Action in U.S. Appl. No. 17/230,206, mailed on Oct. 12, 2023, 19 pages.
Office Action in U.S. Appl. No. 17/231,472, mailed on Oct. 23, 2023, 19 pages.

(56) References Cited

OTHER PUBLICATIONS

Office Action in U.S. Appl. No. 17/244,683, mailed on Oct. 13, 2023, 21 pages.
Extended European Search Report in European Appln. No. 21169773.5, dated Sep. 24, 2021, 4 pages.
Extended European Search Report in European Appln. No. 21169777.6, dated Sep. 24, 2021, 5 pages.
Notice of Allowance in Korean Appln. No. 10-2020-0068413, dated May 31, 2022, 4 pages (with English translation).
Notice of Allowance in Korean Appln. No. 10-2020-0080087, dated Jun. 30, 2022, 5 pages (with English translation).
Office Action in Chinese Appln. No. 202011328161.5, dated Apr. 2, 2022, 15 pages (with English translation).
Office Action in Chinese Appln. No. 202110046911.8, dated Apr. 15, 2022, 12 pages (with English translation).
Office Action in Chinese Appln. No. 202110382635.2, dated Apr. 20, 2022, 12 pages (with English translation).
Office Action in Chinese Appln. No. 202110383659.X, dated Apr. 18, 2022, 13 pages (with English translation).
Office Action in Chinese Appln. No. 202110404827.9, dated Apr. 19, 2022, 13 pages (with English translation).
Office Action in Indian Appln. No. 202114011936, dated May 5, 2022, 5 pages.
Office Action in Japanese Appln. No. 2021-043251, dated May 10, 2022, 6 pages (with English translation).
Office Action in Japanese Appln. No. 2021-073811, dated May 10, 2022, 6 pages (with English translation).
Office Action in Japanese Appln. No. 2021-074825, dated Apr. 19, 2022, 6 pages (with English translation).
Office Action in Japanese Appln. No. 2021-090930, dated Jun. 14, 2022, 10 pages (with English translation).
Extended European Search Report in European Appln. No. 20217533.7, dated Jun. 8, 2021, 5 pages.
Korean Office Action in Korean Appln. No. 2020-0068404, dated Apr. 5, 2021, 11 pages (with English translation).
Korean Office Action in Korean Appln. No. 2020-0068407, dated Apr. 5, 2021, 11 pages (with English translation).
Korean Office Action in Korean Appln. No. 2020-0068611, dated Apr. 5, 2021, 11 pages (with English translation).
Korean Office Action in Korean Appln. No. 2020-0109160, dated Feb. 11, 2021, 21 pages (with English translation).
Notice of Allowance in Japanese Appln. No. 2020-204668, dated Aug. 16, 2022, 5 pages (with English translation).
Office Action in Chinese Appln. No. 202110552518.6, dated Jul. 4, 2022, 18 pages (with English translation).
Decision to Grant a Patent in Japanese Appln. No. 2021-043251, dated Oct. 25, 2022, 5 pages (with English translation).
Office Action in European Appln. No. 20217533.7, dated Nov. 23, 2022, 5 pages.
Office Action in European Appln. No. 21182279.6, dated Oct. 17, 2022, 2 pages.
Office Action in Taiwanese Appln. No. 110117972, dated Oct. 7, 2022, 14 pages (with English translation).
Office Action in U.S. Appl. No. 17/170,035, dated Sep. 29, 2022, 19 pages.
Written Decision on Registration in Korean Appln. No. 10-2020-0080437, dated Oct. 22, 2022, 11 pages (with English translation).
Office Action in Chinese Appln. No. 202011403700.7, dated May 4, 2023, 18 pages (with English translation).
Office Action in Chinese Appln. No. 202110096186.5, dated Jun. 3, 2023, 16 pages (with English translation).
Office Action in U.S. Appl. No. 17/230,206, dated Jun. 22, 2023, 18 pages.
Office Action in U.S. Appl. No. 17/231,472, dated Jun. 23, 2023, 23 pages.
Office Action in Chinese Appln. No. 202011089763, mailed on Feb. 11, 2023, 18 pages (with English translation).
Office Action in Chinese Appln. No. 202011328031, mailed on Feb. 15, 2023, 18 pages (with English translation).
Office Action in Chinese Appln. No. 202110184702, mailed on Mar. 18, 2023, 23 pages (with English translation).
Office Action in Korean Appln. No. 20210129533, mailed on Mar. 28, 2023, 18 pages (with English translation).
Office Action in Korean Appln. No. 20220126062, mailed on Mar. 23, 2023, 23 pages (with English translation).
Office Action in U.S. Appl. No. 17/170,035, mailed on Feb. 8, 2023, 8 pages.
Korean Office Action in Korean Appln. No. 10-2020-0068402, dated Oct. 15, 2020, 20 pages (with English translation).
Office Action in European Appln. No. 21170861.5, mailed on Dec. 16, 2024, 4 pages.

* cited by examiner

MASK APPARATUS

CROSS-REFERENCE TO RELATED APPLICATIONS

The present application claims the benefits of priority to Korean Patent Application No. 10-2020-0068407, filed on Jun. 5, 2020, which is herein incorporated by reference in its entirety.

TECHNICAL FIELD

The present disclosure relates to a mask apparatus.

BACKGROUND

A mask is a device that can cover a user's nose and mouth to prevent or reduce inhalation of germs and dust or droplet transmitting viruses or bacteria.

The mask can be in close contact with the user's face to cover the user's nose and mouth. The mask can filter germs, dust, and the like, which may be contained in the air and provide filtered air into the user's mouth and nose. Air and germs and dust can pass through a body of the mask including a filter configured to block the germs and the dust.

In some cases, the mask can cause uncomfortable breathing since the air is introduced into the user's nose and mouth and discharged to the outside after passing through the body of the mask. In some cases, a mask can include a motor, a fan, and a filter.

In some cases, a mask can include an air purifier that filters external air introduced through an air inlet and directly supplies the air to the inside of the mask.

In some cases, a mask can have a structure in which an air passage through which air filtered by a filter is suctioned from both sides so as to be supplied to a suction fan is provided, and the air discharged from the suction fan is supplied to a user along a flow space defined above the air passage inside the mask.

In some cases, where the air filtered by the air purifier is directly supplied to the user, the user's breathing may become uncomfortable due to a pressure of the air discharged from the air purifier.

In some cases, an amount of air supplied through the air inlet may depend on the number of rotation of a blowing fan. For instance, when the number of rotation of the blowing fan increases, the amount of air to be supplied may increase, and vibration caused by the blowing fan may also increase.

In some cases, where the suction fan is disposed in front of the air passage, a length of the mask in a front and rear direction may increase.

Based on the increase of the length of the mask in the front and rear direction, a length of a flow space defined above the air passage in the front and rear direction may also increase, and flow resistance may increase due to an increasing flow distance of the air.

In some cases, a time until the air is supplied to the user after the suction fan operates may increase by the increasing flow distance of the air.

SUMMARY

The present application describes a mask apparatus that can increase a flow rate of air supplied to a user.

The present application also describes a mask apparatus including a blowing fan that has an improved efficiency.

The present application further describes a mask apparatus that can reduce a flow noise generated by a flow of air.

The present application further describes a mask apparatus that can reduce a discharge pressure of air supplied to the user.

According to one aspect of the subject matter described in this application, a mask apparatus includes a mask body, a seal that is disposed at a rear surface of the mask body, that is configured to contact a user's face, and that defines a breathing space configured to accommodate the user's mouth or nose or both based on the seal contacting the user's face, a fan module that is disposed at a front surface of the mask body, that is configured to receive external air, and that defines a fan outlet configured to discharge the external air toward the breathing space, and a mask body cover that covers the fan module and is coupled to the front surface of the mask body. The mask body includes an air duct configured to guide the external air from the fan module to the breathing space, and an air exhaust hole configured to discharge air exhaled into the breathing space to an outside of the mask body. The air duct has (i) a duct inlet configured to communicate with the fan outlet and (ii) a duct outlet configured to communicate with the breathing space, where an area of the duct outlet is greater than an area of the duct inlet.

Implementations according to this aspect may include one or more of the following features. For example, the air duct can include a front surface portion spaced apart from the front surface of the mask body and disposed forward relative to the front surface of the mask body, a side surface portion that is disposed at a side end of the front surface portion and defines the duct inlet, a top surface portion that connects an upper end of the front surface portion of the air duct to the front surface of the mask body, a bottom surface portion that connects a lower end of the front surface portion of the air duct to the front surface of the mask body, and a cutoff portion that defines the duct outlet. The cutoff portion is defined by a rear end of the side surface portion, a rear end of the top surface portion, a rear end of bottom surface portion, and a rear side of the front surface portion.

In some implementations, the cutoff portion can include an inner side end that is disposed adjacent to a center axis of the mask body and extends along the center axis, and an outer side end that is disposed away from the center axis relative to the inner side end and extends along the center axis, where an extension length of the inner side end along the center axis is greater than an extension length of the outer side end along the center axis. In some examples, the front surface portion of the air duct can include a curved portion that extends from the duct inlet toward the center axis of the mask apparatus and that has a predetermined curvature, and a flat portion that extends from an end of the curved portion toward the center axis of the mask apparatus.

In some examples, the top surface portion of the air duct extends along a first virtual line that extends from an upper end of the side surface portion of the air duct toward the center axis, where the first virtual line is inclined with respect to a second virtual line that extends horizontally from the upper end of the side surface portion of the air duct toward the center axis. An angle defined between the first virtual line and the second virtual line can be in a range from 20 degrees to 40 degrees.

In some implementations, the flat portion can include an uneven portion disposed on a rear surface of the flat portion. In some implementations, the uneven portion can include convex portions and concave portions that are alternately arranged along a flow direction of air in the air duct and that extend in a direction crossing the flow direction of air in the air duct.

In some implementations, the mask body can include a plurality of division portions that protrude from the rear side of the front surface portion of the air duct and that are configured to divide a flow of the external air introduced into the air duct. In some examples, the plurality of division portions extend along the flow direction of air in the air duct and are disposed between the upper end of the front surface portion and the lower end of the front surface portion. The plurality of division portions can be spaced apart from one another by a predetermined distance.

In some implementations, the mask apparatus can include a sealing bracket that couples the seal to the rear surface of the mask body. The sealing bracket can include a bracket body having a band shape that extends along the seal, and a bracket insertion portion that extends from an inner edge of the bracket body. In some examples, the cutoff portion can include a first space including the duct outlet, the first space being in communication with the air duct and the breathing space, and a second space that is covered by the bracket insertion portion and defines a portion of the rear surface of the air duct.

In some implementations, each of the plurality of division portions can include a bracket coupling groove that supports the bracket insertion portion. In some implementations, the mask apparatus can include a fan module support that is recessed from each of the top surface portion and the bottom surface portion toward the duct inlet. The fan module support can limit insertion of the fan module into the duct inlet.

In some implementations, the fan module can include a fan housing that defines the fan outlet, and a fan inlet that is configured to receive the external air, and a fan accommodated in the fan housing. The mask body can include a fan module mounting portion disposed at the front surface of the mask body and configured to accommodate the fan module. In some examples, the fan module mounting portion can include a pair of fixing ribs that extend along the top surface portion and the bottom surface portion toward a side end of the mask body and that are configured to support top and bottom surfaces of the fan housing, respectively, and a fan module coupling portion that protrudes from the front surface of the mask body and is disposed adjacent to a side end of each of the pair of fixing ribs. The fan module coupling portion can be configured to receive a coupling member passing through an edge of the fan housing.

In some implementations, the mask body defines an air discharge port at a lower portion of the mask body below the breathing space, where the air discharge port is configured to discharge the air exhaled into the breathing space to an outside of the mask body, and the air discharge port includes the air exhaust hole. In some examples, the mask body cover can include a filter mounting portion that defines an air suction hole at a rear side of the filter mounting portion, where the air suction hole is configured to communicate with the fan inlet.

In some implementations, the mask body can include a hook mounting portion disposed at each of a left side and a right side of the mask body. In some implementations, the mask body defines a cover coupling groove along a front edge of the mask body, the cover coupling groove being configured to receive an edge of the mask body cover.

In some implementations, the mask body can include a plurality of cover coupling portions configured to couple to the mask body cover. The plurality of cover coupling portions can include a pair of first cover coupling portions that are disposed at an upper portion of the front surface of the mask body and protrude forward relative to the front surface of the mask body, and a pair of second cover coupling portions that are disposed at a lower portion of the front surface of the mask body and protrude forward relative to the front surface of the mask body.

In some implementations, since the flow rate of the air introduced into the breathing space of the mask is reduced, and the air is uniformly diffused inside the breathing space, the user can comfortably breathe.

In some implementations, the flow rate of the air can increase at a time point at which the user inhales to provide a large amount of air to the user.

In some implementations, the noise generated by the flowing air can be reduced.

In some implementations, the air supplied to the breathing space can be uniformly diffused.

In some implementations, since the air supplied to the breathing space is branched and supplied, the discharge pressure of the air can be reduced.

In some implementations, the flow cross-sectional area of the flowing air can be changed to reduce the pressure of the air.

In some implementations, the flow cross-sectional area of flowing air, the flow rate of the air can be improved.

In some implementations, the flow direction of the flowing air can be guided and minimize the flow resistance generated in the passage.

In some implementations, the air duct can be integrated with the mask body, which can simplify the manufacturing process of the mask.

In some implementations, the centrifugal fan can be used to minimize the length in the axial direction, thereby designing a compact mask.

In some implementations, the components of the mask apparatus can be coupled in close contact with each other to eliminate or reduce the gap between the components.

In some implementations, the filter can be easily replaced.

In some implementations, the filter can be firmly fixed to the mask cover by the filter cover.

In some implementations, the flow rate of the air passing through the air duct can increase in comparison with the number of rotation of the fan to improve the efficiency of the fan.

In some implementations, the flow noise generated by the increasing flow rate can be reduced while the flow rate increases.

DETAILED DESCRIPTION

Hereinafter, a mask apparatus of the present disclosure will be described in detail with reference to the drawings.

Figure 1:
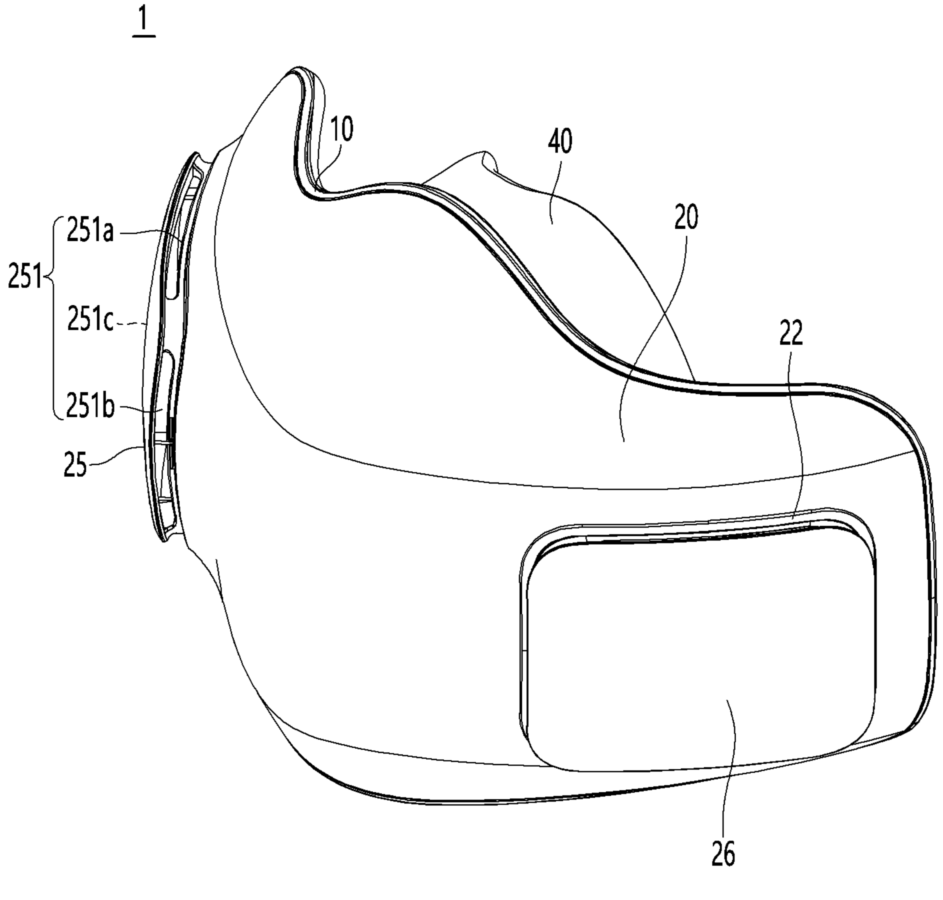
FIG. 1 is a left perspective view showing an example of a mask apparatus.
Figure 2:
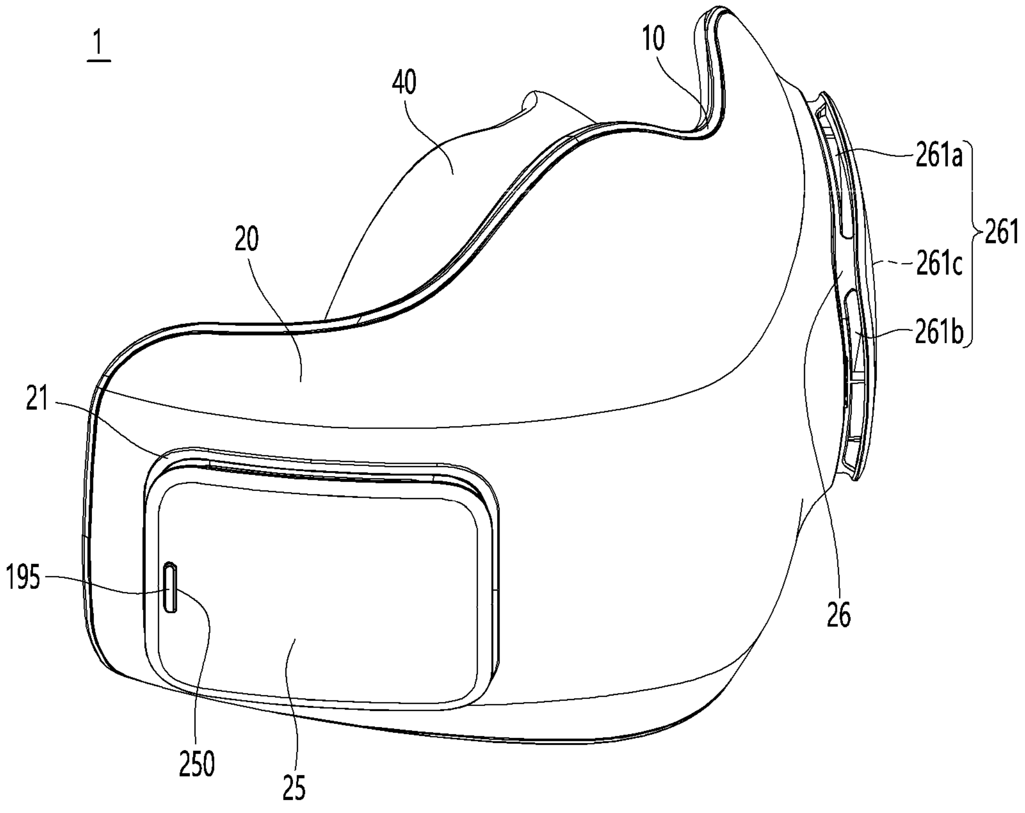
FIG. 2 is a right perspective view of the mask apparatus.
Figure 3:
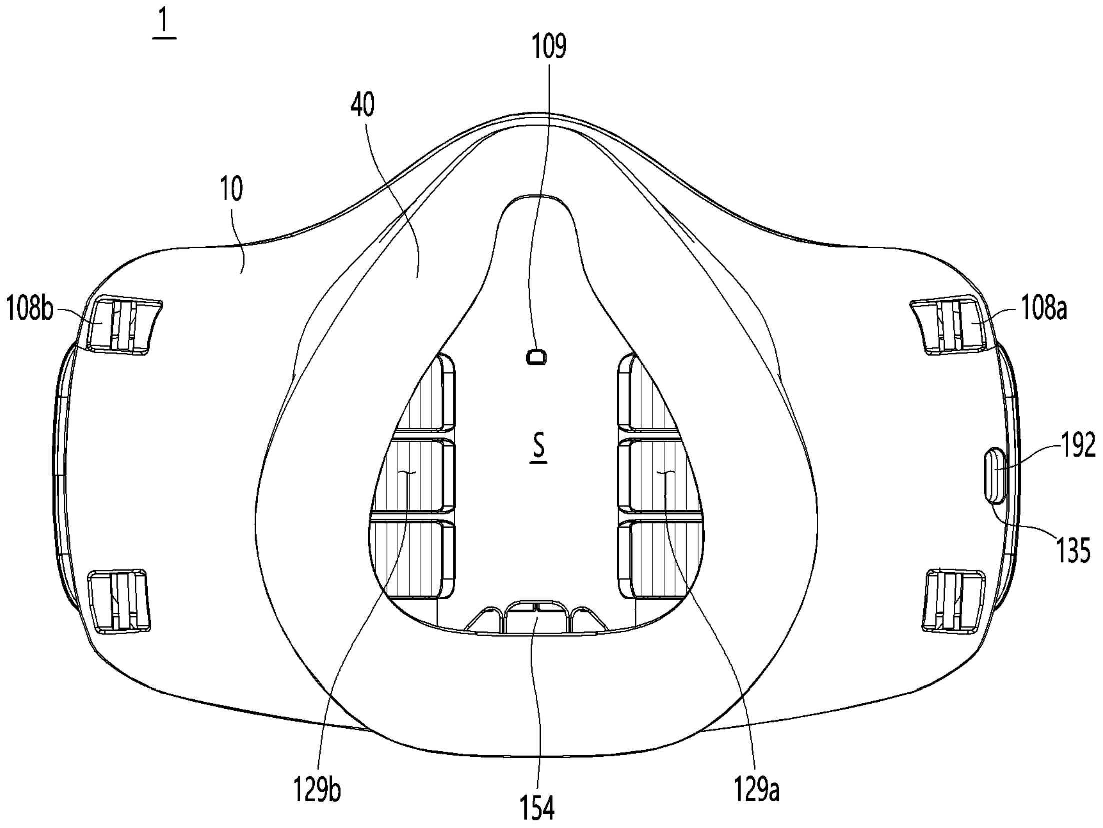
FIG. 3 is a rear view of the mask apparatus.
Figure 4:
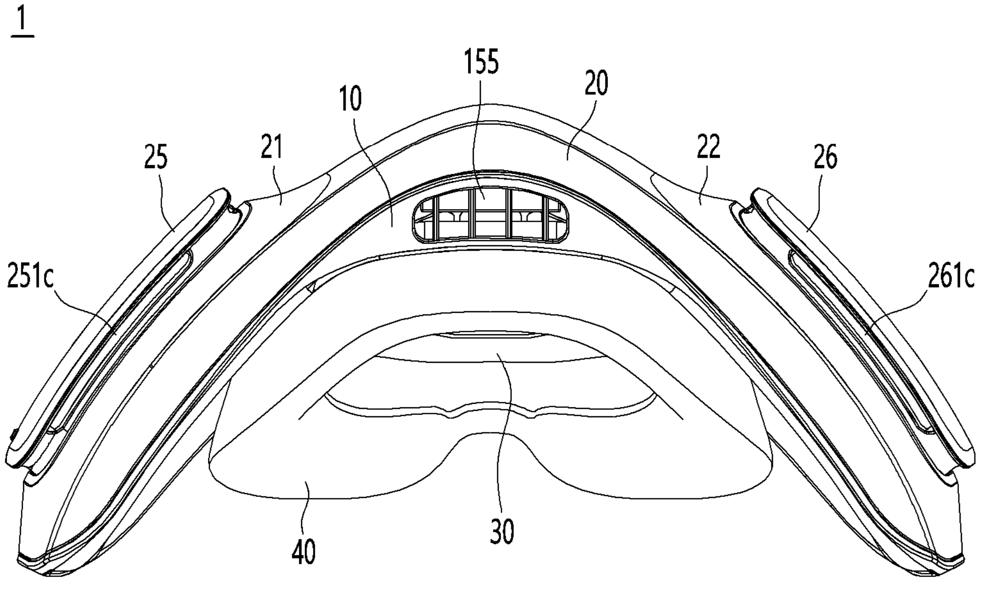
FIG. 4 is a bottom view of the mask apparatus.

FIG. 1 is a left perspective view showing an example of a mask apparatus, FIG. 2 is a right perspective view of the mask apparatus, FIG. 3 is a rear view of the mask apparatus, and FIG. 4 is a bottom view of the mask apparatus.

Referring to FIGS. 1 to 4, a mask apparatus 1 can include a mask body 10 and a mask body cover 20 coupled to the mask body 10.

The mask body 10 and the mask body cover 20 can be detachably coupled to each other. When the mask body 10 and the mask body cover 20 are coupled to each other, an inner space can be defined between the mask body 10 and the mask body cover 20. Constituents for driving the mask apparatus 1 can be disposed in the inner space. The inner space can be defined between a front surface of the mask body 10 and a rear surface of the mask body cover 20. The mask body 10 can define a rear surface of the mask apparatus 1, and the mask body cover 20 can define a front surface of the mask apparatus 1.

A rear side of the mask apparatus 1 is defined as a direction in which the rear surface of the mask apparatus 1 facing a user's face is disposed, and a front side of the mask apparatus 1 is defined as a direction which is opposite to the rear side and in which a front surface of the mask apparatus, which is exposed to the outside, is disposed.

The mask apparatus 1 can further include a sealing bracket 30 and a seal 40 that is detachably coupled to the sealing bracket 30.

The sealing bracket 30 can be detachably coupled to a rear surface of the mask body 10 to fix the seal 40 to the rear surface of the mask body 10. In some examples, when the sealing bracket 30 is separated from the rear surface of the mask body 10, the seal 40 can be separated from the mask body 10.

The seal 40 can be supported on the rear surface of the mask body 10 by the sealing bracket 30, and a breathing space S for breathing can be defined between the seal 40 and the rear surface of the mask body 10. The seal 40 can be in close contact with a user's face and can surround user's nose and mouth to restrict introduction of external air into the suction space.

The mask body cover 20 can include a first filter mounting portion 21 and a second filter mounting portion 22. The first filter mounting portion 21 can be disposed at a right side of the mask body cover 20, and the second filter mounting portion 22 can be disposed at a left side of the mask body cover 20.

A left direction (left side) and a right direction (right side) are defined based on the mask apparatus 1 worn on the user's face. That is, in the state in which the user wearing the mask apparatus 1, a right side of the user is defined as the right side of the mask apparatus 1, and a left side of the user is defined as the left side of the mask apparatus 1.

In some examples, an upward direction (upward side) and a downward direction (downward side) are defined based on the mask apparatus 1 mounted on the user's face.

A first filter cover 25 can be mounted on the first filter mounting portion 21, and a second filter cover 26 can be mounted on the second filter mounting portion 22. Filters 23 and (see FIG. 5) can be disposed inside the first filter mounting portion 21 and the second filter mounting portion 22, and the first filter cover 25 and the second filter cover 26 can cover the filter.

The first filter cover 25 and the second filter cover 26 can be detachably coupled to the first filter mounting portion 21 and the second filter mounting portion 22. For example, the first filter cover 25 and the second filter cover 26 can be coupled to be fitted into the first filter mounting portion 21 and the second filter mounting portion 22, respectively.

Each of the first filter cover 25 and the second filter cover 26 can include a front surface portion and side surface portions extending backward along an edge of the front surface portion or an edge of a rear surface.

Each of the side surface portions of the first filter cover 25 and the second filter cover 26 can have four side surfaces, and the four side surfaces can include an upper side surface, a lower side surface, a left side surface, and a right side surface.

One or a plurality of first air inlets 251 can be defined in the side surface portion of the first filter cover 25. One or a plurality of second air inlets 261 can also be defined in the side surface portion of the second filter cover 26.

In the state in which the first filter cover 25 is mounted on the first filter mounting portion 21, the first air inlet 251 can be defined to be exposed to the outside. In the state in which the second filter cover 26 is mounted on the second filter mounting portion 22, the second air inlet 261 can be defined to be exposed to the outside.

The first air inlet 251 and the second air inlet 261 can be defined in the side surfaces of the first filter cover 25 and the second filter cover 26, respectively. It should be noted that each of the first and second air inlets 251 and 261 are respectively defined in the front surface portions of the first and second filter covers 25 and 26.

The first air inlet 251 and the second air inlet 261 can be defined at a point closer to the front surface portion from a line that bisects the side surface portion.

When a plurality of the first air inlets 251 are provided in the side surface portions of the first filter cover 25, the first air inlets 251 can include a first air suction hole 251*a* defined in the right side surface, a second air suction hole 251*b* defined in the left side surface, and a third air suction hole 251*c* defined in the upper side surface.

Similarly, when a plurality of the second air inlets 261 are provided in the side surface portions of the second filter cover 26, the second air inlets 261 can include a first air suction hole 261*a* defined in the left side surface, a second air suction hole 261*b* defined in the right side surface, and a third air suction hole 261*c* defined in the upper side surface.

An opening 250 can be defined in one of the first filter cover 25 and the second filter cover 26, and the opening 250 can be defined in an edge of one of the first filter cover 25 and the second filter cover 26. In some examples, a manipulation portion 195 for controlling an operation of the mask apparatus 1 can be mounted in the opening 250. In some implementations, the manipulation portion 195 is mounted on the first filter cover 25 as an example.

The manipulation portion 195 can serve as a manipulation switch that turns on/off power of the mask apparatus 1. The manipulation portion 195 can be exposed to the front side of the mask apparatus 1 while being mounted in the opening 250.

The mask body 10 can include a hook mounting portion 108. The hook mounting portion 108 can be provided on the left and right sides of the mask body 10.

That is, the hook mounting portion 108 can include a first hook mounting portion 108*a* provided at a right side of the mask body 10, and a second hook mounting portion 108*b* provided at a left side of the mask body 10.

Each of the first hook mounting portion 108*a* and the second hook mounting portion 108*b* can be provided in plurality to be spaced apart from each other in a vertical direction of the mask body 10. In detail, the first hook mounting portion 108*a* can be provided at each of the upper right and lower right sides of the mask body 10, and the second hook mounting portion 108*b* can be provided at each of the upper left and lower left sides of the mask body 10.

A band for maintaining the mask apparatus 1 in close contact with the user's face can be mounted on the hook mounting portion 108.

For example, both ends of the band can connect the first hook mounting portion 108*a* to the second hook mounting portion 108*b* or connect each of two first hook mounting portions 108*a* spaced apart from each other in the vertical direction and each of the plurality of second hook mounting portions 108*b* spaced apart from each other in the vertical direction to each other.

In the former case, the band can have a shape surrounding the user's occipital region, and in the latter case, the band can have a shape that is hooked on both ears of the user.

The hook mounting portion 108 can be formed by cutting a portion of the mask body 10. Thus, air can be introduced into the inner space between the mask body 10 and the mask body cover 20 through a gap defined in the hook mounting portion 108.

In detail, the external air introduced into the inner space through the hook mounting portion 108 can cool electronic components disposed in the inner space. In some examples, the air of which a temperature increases while cooling the electronic components can be discharged again to the outside of the mask body 10 through the hook mounting portion 108. In some examples, to restrict a flow of the air introduced into the inner space through the hook mounting portion 108 into the breathing space, the inside of the mask apparatus 1 can have a sealing structure.

The mask body 10 can include an air outlet 129 for supplying the filtered air to the breathing space. The user can breathe while breathing the filtered air supplied through the air outlet 129 to the breathing space.

The air outlet 129 can include a first air outlet 129*a* through which the filtered air introduced into the first air inlet 251 is discharged to the suction space and a second air outlet 129*b* through which the filtered air introduced into the second air inlet 261 is discharged to the suction space.

The first air outlet 129*a* can be defined at a right side with respect to a center of the mask body 10, and the second air outlet 129*b* can be defined at a left side with respect to the center of the mask body 10. The air introduced through the first air inlet 251 can pass through the filter 23 and then flow to the first air outlet 129*a*. The air introduced through the second air inlet 261 can pass through the second filter 24 and then flow to the second air inlet 261.

The mask body 10 can include air exhaust holes 154 and 155 for discharging air exhaled by the user to an external space. The air exhaust holes 154 and 155 can be defined in a lower portion the mask body 10.

The air exhaust holes 154 and 155 can include a first air exhaust hole 154 defined in a front lower end of the mask body 10 and a second air exhaust hole 155 defined in a bottom surface of the mask body 10.

In detail, a rib extending forward can be formed at the front lower end of the mask body 10, and a surface defined by the rib can be defined as the bottom surface of the mask body 10.

A flow space through the air flowing toward the second air exhaust hole 155 by passing through the first air exhaust hole 154 descends can be defined between the mask body 10 and the mask body cover 20.

A check valve can be provided in one or more of the first air exhaust hole 154 and the second air exhaust hole 155. The external air can be introduced into the breathing space, or the air discharged through the second air exhaust hole 155 can be restricted from flow backward by the check valve.

The check valve can be disposed in the flow space between the first air exhaust hole 154 to the second air exhaust hole 155.

For example, the check valve having the form of a flat flap with a size and shape corresponding to the size and shape of the first air exhaust hole 154 can be provided.

In detail, an upper end of the flap can be connected to an upper edge of the first air exhaust hole 154, and when the user exhales, the flap can be bent or rotates to open the first air exhaust hole 154, and when the user inhales, the flap can be in close contact with the first air exhaust hole 154 to block the external air or the discharged air from being introduced again into the breathing space.

The mask body 10 can include a sensor mounting portion 109. The sensor mounting portion 109 can be equipped with a sensor for acquiring various pieces of information from the breathing space. The sensor mounting portion 109 can be disposed above the mask body 10. When the user breathes, the sensor mounting portion 109 can be disposed above the mask body 10 in consideration of a position at which a pressure change in the breathing space is constantly sensed.

The mask body 10 can include a connector hole 135. The connector hole 135 can be understood as an opening in which a connector 192 for supplying power to the mask apparatus 1 is installed. The connector hole 135 can be defined at either a left edge or a right edge of the mask body 10.

In some implementations, since the manipulation portion 195 and the connector 192 are connected to a power module 19 (see FIG. 5) to be described later, the connector hole 135 can be provided at one side of the left or the right side of the mask body 10, which corresponds to the position at which the power module 19 is installed.

Hereinafter, constituents of the mask apparatus 1 will be described in detail based on an exploded perspective view.

Figure 5:
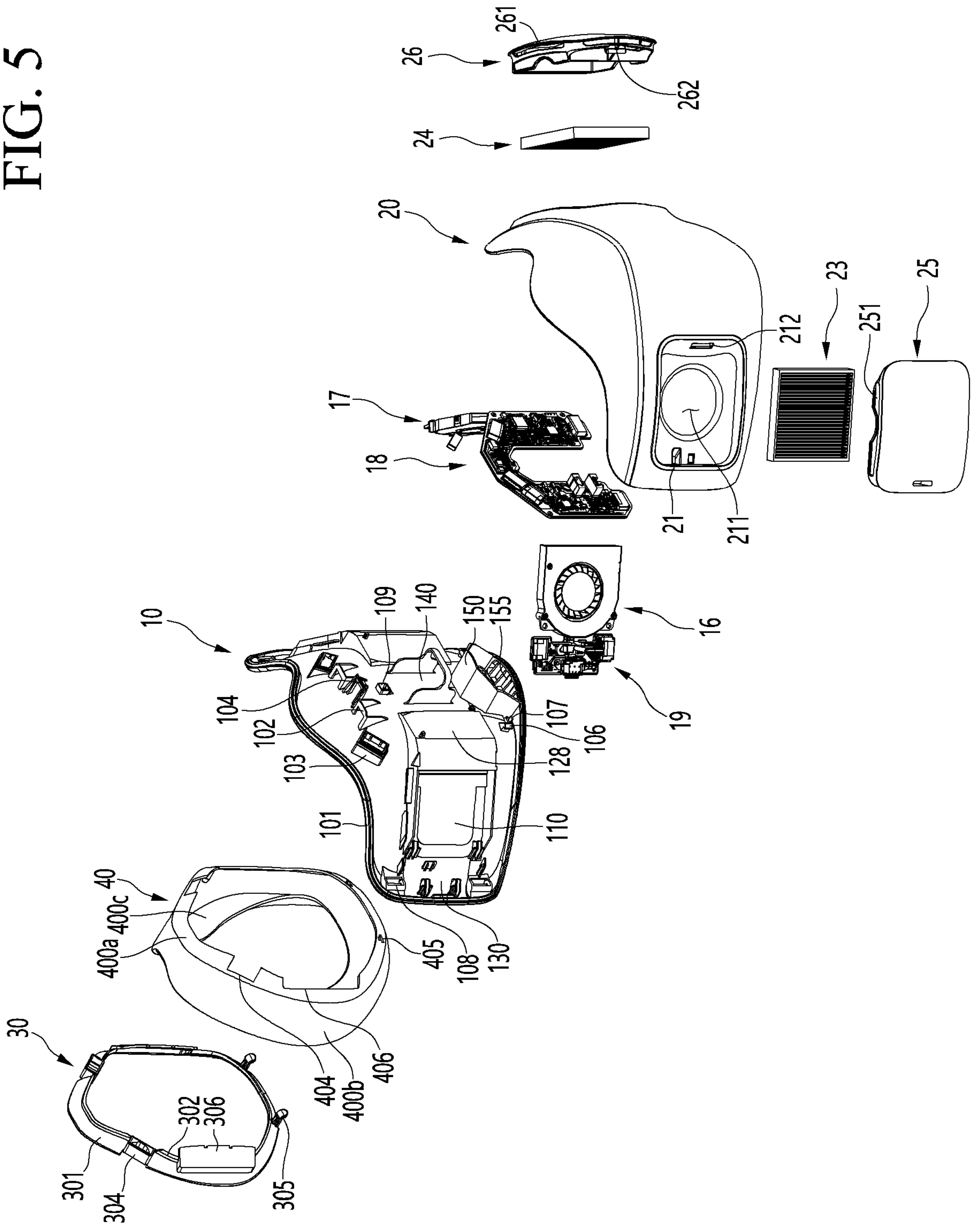
FIG. 5 is an exploded perspective view of the mask apparatus.

FIG. 5 is an exploded perspective view of the mask apparatus.

Referring to FIG. 5, the mask apparatus 1 can include the mask body 10, the mask body cover 20, the sealing bracket 30, and the seal 40.

In detail, the mask body 10 and the mask body cover 20 can be coupled to each other to form an outer appearance of the mask apparatus 1.

An inner space for accommodating components for the operation of the mask apparatus 1 can be defined between the mask body 10 and the mask body cover 20. The sealing bracket 30 and the seal 40 can be coupled to the rear surface of the mask body 10 to define the breathing space between the user's face and the mask body 10 and to block introduction of the external air to the breathing space.

The mask body 10 can include a cover coupling groove 101. The cover coupling groove 101 can be defined along a front edge of the mask body 10. The cover coupling groove 101 can be defined by a height difference. The cover coupling groove 101 can be defined to correspond to an edge of the mask body cover 20. The cover coupling groove 101 can be defined by recessing a portion of the front surface of the mask body 10 backward. The mask body cover 20 can move toward the cover coupling groove 101 of the mask body 10 to allow the mask body cover 20 to be inserted into the cover coupling groove 101.

The mask body 10 can include a first cover coupling portion 102. An upper portion of the mask body cover 20 can be supported on the first cover coupling portion 102. The first cover coupling portion 102 can be disposed on a front upper portion of the mask body 10.

For example, the first cover coupling portion 102 can have a structure that is capable of being hook-coupled. The hook coupled to the first cover coupling portion 102 can be disposed on a rear surface of the mask body cover 20.

The first cover coupling portion 102 can be provided in plurality, and the hook can also be provided in plurality to correspond to the first cover coupling portions 102. In some implementations, the first cover coupling portion 102 can be provided at the left and right sides of the mask body 10 based on the center of the mask body 10. The first cover coupling portion 102 can be referred to as an upper cover coupling portion.

The mask body 10 can include a first bracket coupling portion 103.

The first bracket coupling portion 103 can support an upper portion of the sealing bracket 30. The first bracket coupling portion 103 can be disposed above a rear surface of the mask body 10. For example, the first bracket coupling portion 103 can be provided in the form of a hook that protrudes backward from the rear surface of the mask body 10. A first body coupling portion 304 coupled to the first bracket coupling portion 103 can be disposed on the sealing bracket 30.

The first body coupling portion 304 can be provided in plurality to correspond to the plurality of first bracket coupling portions 103. The mask body 10 can include a support rib 104.

The support rib 104 can be provided to protrude forward from the front surface of the mask body 10. The support rib 104 can contact the rear surface of the mask body cover 20 when the mask body cover 20 is coupled to the mask body 10.

The mask body 10 and the mask body cover 20 can resist external forces acting in a front and rear direction by the support rib 104. The support ribs 104 can be provided in a plurality on the front surface of the mask body 10.

The mask body 10 can include a second cover coupling portion 106.

A lower portion of the mask body cover 20 can be supported on the second cover coupling portion 106. The second cover coupling portion 106 can protrude in a hook shape from a front lower portion of the mask body 10. The first cover coupling portion 102 can be provided at each of the left and right sides of the mask body 10 based on the center of the mask body 10. The second cover coupling portion 106 can be defined as a lower cover coupling portion.

A hook hooking portion to which the second cover coupling portion 106 is coupled can be disposed on each of the left and right sides of the mask body cover 20 on the rear surface of the mask body cover 20.

The mask body 10 can include a second bracket coupling portion 107.

A lower portion of the sealing bracket 30 can be supported on the second bracket coupling portion 107. The second bracket coupling portion 107 can be provided by opening the mask body 10. The second bracket coupling portion 107 can be disposed in a lower portion of the mask body 10. For example, the second bracket coupling portion 107 can be provided as a through-hole defined in the mask body 10.

A second body coupling portion 305 coupled to the second bracket coupling portion 107 can be disposed on the sealing bracket 30. The second bracket coupling portion 107 can be provided in plurality, and the second body coupling portion 305 can also be provided in plurality to correspond to the second bracket coupling portions 107. In some implementations, the second bracket coupling portion 107 can be provided at each of the left and right sides with respect to the center of the mask body 10. The second bracket coupling portion 107 can be defined as a lower bracket coupling portion.

The mask body 10 can include the above-described sensor mounting portion 109.

The sensor mounting portion 109 can have a rib shape in which a portion of the front surface of the mask body 10 protrudes forward. In detail, the sensor mounting portion 109 has a rib shape that is surrounded along an edge of the sensor, and an installation space in which the sensor is installed is defined in the sensor mounting portion 109.

A hole through which the installation space and the breathing space communicate with each other is defined in the mask body 10 corresponding to the inside of the sensor mounting portion 109. The sensor disposed in the installation space can include a pressure sensor, and the pressure sensor can sense pressure information of the breathing space through the hole.

The mask body 10 can include a fan module mounting portion 110.

The fan module mounting portion 110 can include a first fan module mounting portion on which a first fan module 16 is mounted and a second fan module mounting portion on which a second fan module 17 is mounted.

The first fan module mounting portion and the second fan module mounting portion can be disposed on the front surface of the mask body 10. In detail, the first fan module mounting portion can be disposed at the right side of the mask body 10, and the second fan module mounting portion can be disposed at the left side of the mask body 10.

The first fan module 16 and the second fan module 17 can be detachably coupled to the first fan module mounting portion and the second fan module mounting portion, respectively.

The mask body 10 can include an air duct 120.

The air duct 120 can be disposed on the front surface of the mask body 10.

A passage through which air passes can be provided in the air duct 120.

The air duct 120 can include a first air duct connected to the first fan module mounting portion and a second air duct connected to the second fan module mounting portion.

The first air duct and the second air duct can be respectively disposed on an edge of the first fan module mounting portion and an edge of the second fan module mounting portion, which are adjacent to the center of the front surface of the mask body 10 so as to be disposed between the first fan module mounting portion and the second fan module mounting portion.

In some examples, the first fan module mounting portion and the second fan module mounting portion can have a shape symmetrical with respect to a vertical plane (or a vertical line) passing through the center of the front surface of the mask body 10. Similarly, the first air duct and the second air duct can also have a shape symmetrical with respect to the vertical plane or the vertical line passing through the center of the front surface of the mask body 10.

One end of the air duct 120 communicates with the outlets of the fan modules 16 and 17 to allow the external air to be introduced into the air duct 120. In addition, the other end of the air duct 120 communicates with the air outlet 129 so that the external air introduced into the air duct 120 is discharged into the breathing space S.

The air duct 120 can include a control module mounting portion 128 for mounting the control module 18. A portion of the front surface of the air duct 120 can be provided as a flat portion on which the control module 18 is capable of being seated, and the flat portion can be defined as the control module mounting portion 128. The control module mounting portion 128 can include a first control module mounting portion **128*a* (see FIG. 9) provided in the front surface of the first air duct and a second control module mounting portion 128*b* (see FIG. 9) provided in the front surface of the second air duct. One control module 18 can be fixed to the first control module mounting portion 128*a* and the second control module mounting portion 128*b*, or a plurality of control modules can be respectively fixed to the first and second control module mounting portions 128*a* and 128*b***.

The mask body 10 can include a power module mounting portion 130 for mounting the power module 19.

The power module mounting portion 130 can be disposed on the front surface of the mask body 10. The power module mounting portion 130 can be provided at one of the left and the right side of the mask body 10.

The power module mounting portion 130 can be disposed at the side of the fan module mounting portion 110. Specifically, the power module mounting portion 130 can be provided between the fan module mounting portion 110 and a side end of the mask body 10. The side end of the mask body 10 can be defined as an end adjacent to the user's ear when worn. In some examples, a connector hole 135 can be defined in the side end of the mask body 10 provided with the power module mounting portion 130.

The mask body 10 can include a battery mounting portion 140 for mounting a battery.

The battery mounting portion 140 can be disposed at a center of the front surface of the mask body 10. The battery mounting portion 140 can be provided to protrude forward from the front surface of the mask body 10 so as to surround the battery.

For example, the battery mounting portion 140 can include a pair of guide ribs protruding forward from the front surface of the mask body 10 and a connection rib connecting front ends of the pair of guide ribs to each other. In some examples, the battery can be mounted in a battery accommodation space defined by the pair of guide ribs and the connection rib.

The battery can move downward from an upper side of the battery accommodating space and be inserted into the battery accommodating space and then can move in a reverse direction to be separated. A lower portion of the battery inserted into the battery mounting portion 140 can be supported by an air discharge portion 150 to be described later.

The mask body 10 can include the air discharge portion 150.

The air discharge portion 150 can be disposed in a lower portion of the mask body 10. The air discharge portion 150 can define a flow space through which the air flowing from the first air exhaust hole 154 toward the second air exhaust hole 155 passes.

The air discharge portion 150 can protrude forward from the front surface of the mask body 10. In some examples, the air discharge portion 150 can extend to be rounded in an arch shape or can be bent several times to extend.

When the mask body cover 20 is coupled to the mask body 10, a front end of the air discharge portion 150 can contact the rear surface of the mask body cover 20, and the inner space of the mask body 10 and the flow space can be distinguished from each other.

The air discharge portion 150 can define a top surface and both side surfaces of the flow space, and a rear surface of the mask body cover 20 can define a front surface of the flow space. In some examples, the front surface of the mask body 10 can define a rear surface of the flow space, and the bottom surface of the mask body 10 on which the second air exhaust hole 155 is defined can define a bottom surface of the flow space.

The top surface of the air discharge portion 150 can support a lower end of the battery. It is connected to lower ends of both sides of the air discharge portion 150 having the arch shape or tunnel shape can be connected to the bottom surface of the mask body 10, and the bottom surface of the mask body 10 can be defined by the rib extending forward from the lower end of the front surface of the mask body 10.

The cover coupling groove 101 is recessed along the front end of the rib defining the bottom surface of the mask body 10, and the lower end of the rear surface of the mask body cover 20 is coupled to the cover coupling groove 101.

The first air exhaust hole 154 can be defined in the front surface of the mask body 10 defining the rear surface of the flow space.

The mask body cover 20 can include a pair of filter mounting portions 21 and 22, as described above.

The filter mounting portions 21 and 22 can be provided by recessing the front surface of the mask body cover 20 to be recessed by a predetermined depth toward the rear surface of the mask body cover 20. Filters 23 and 24 are accommodated inside the filter mounting portions 21 and 22 provided by being recessed, and filter covers 25 and 26 can be mounted on edges of the filter mounting portions 21 and 22 in the state in which the filters 23 and 24 are accommodated.

Air suction ports 211 and 221 can be defined in the filter mounting portions 21 and 22. The air suction holes 211 and 221 can communicate with fan inlets defined in bottom surfaces of the fan modules 16 and 17, respectively. Each of edges of the air suction ports 211 and 221 can have an inclined surface that inclined in a direction in which a diameter gradually decreases from the front surface to the rear surface.

A filter cover mounting groove 212,222 for fixing each of the filter covers 25 and 26 can be defined in a side surface of each of the filter mounting portions 21 and 22. A coupling protrusion inserted into the filter cover mounting groove 212,222 and 222 can be disposed on each of the filter covers 25 and 26. In FIG. 5, only the coupling protrusion 262 disposed on the left filter cover 26 is illustrated, but it is noted that the same coupling protrusion is disposed on the right filter cover 25 as well.

A sealing material for sealing can be provided between the edges of the rear surfaces of the air suction ports 211 and 221 of the filter mounting portions 21 and 22 and the fan inlets of the fan modules 16 and 17. The sealing material can surround the air suction ports 211 and 221 and edges of the fan inlets of the fan modules 16 and 17 to prevent or reduce introduction of the external air.

Alternatively, instead of providing the sealing material, an orifice is disposed on each of the edges of the air suction holes 211 and 221, and the orifice can be in close contact with the edges of the fan suction holes of the fan module 16 and 17 to the external air from being introduced. The orifice can be understood as a guide rib extending or protruding backward along the edges of the air suction holes 211 and 221.

The filter mounting portions 21 and 22 include a first filter mounting portion 21 provided at the right side of the mask body cover 20 and a second filter mounting portion 22 provided at the left side of the mask body cover 20.

The air suction hole defined in the first filter mounting portion 21 can be defined as a first air suction hole 211, and the air suction hole defined in the second filter mounting portion 22 can be defined as a second air suction hole 221.

The filters 23 and 24 can include a first filter 23 accommodated inside the first filter mounting portion 21 and a second filter 24 accommodated inside the second filter mounting portion 22.

The filter covers 25 and 26 can include a first filter cover 25 mounted on the first filter mounting portion 21 and a second filter cover 26 mounted on the second filter mounting portion 22. A plurality of first air inlets 251 can be defined in the first filter cover 25 to allow the external air to be introduced, and a plurality of second air inlets 261 can be defined in the second filter cover 26 to allow the external air to be introduced.

The control module 18 can be referred to as a first electronic circuit component, and the power module 19 can be referred to as a second electronic circuit component.

The fan modules 16 and 17 can include a fan, a fan motor, and a fan housing accommodating the fan and the fan motor. The fan housing can include a fan inlet through which the air is introduced into the fan, and a fan outlet through which the air forcedly flowing by the fan is discharged.

The fan can include various types of fans. For example, in some implementations, the fan can include a centrifugal fan that can suction air from the front side of the mask body cover 20 and discharge the air to the side of the mask body 10. In some implementations, the fan can include an axial fan or a cross flow fan.

The air introduced through the first air inlet 251 to pass through the first filter 23 is suctioned through the first air suction port 211. In some examples, the air introduced through the second air inlet 261 to pass through the second filter 24 is suctioned through the second air suction port 221.

The fan outlet of the first fan module 16 can communicate with the first air duct to discharge the air to the breathing space, and the fan outlet of the second fan module 17 can communicate with the second air duct to discharge the air to the breathing space.

The control module 18 can control an operation of the mask apparatus 1. The control module 18 can be fixed to control module mounting portion 128.

The control module 18 can include a communication module to transmit and receive various types of information. The control module 18 can include a data storage module to store various types of information.

The control module 18 can control an operation of each of the fan modules 16 and 17. In detail, the control module 18 can control the operation of each of the fan modules 16 and 17 based on information sensed from the sensor.

The control module 18 can be electrically connected to the power module 19, the fan modules 16 and 17, and the battery so as to be interlocked with each other.

The power module 19 can receive power from the outside. The power module 19 can include a charging circuit for charging the battery. The power module 19 can include the connector 192 (see FIG. 10) and the manipulation portion 195. Thus, the control module 18 can operate by receiving battery power or external power through the connector 192.

The power module 19 can control supply of power to the mask apparatus 1 by the manipulation portion 195. In detail, the power module 19 can control supply of power from the battery to the control module 18 and the fan modules 16 and 17.

The seal 40 can be coupled to the rear surface of the mask body 10 by the sealing bracket 30 to be in close contact with the user's face.

The rear surface of the mask body 10 can be to be spaced apart from the user's face by the seal 40.

The sealing bracket 30 can be provided in a ring shape forming a closed loop.

The seal 40 can be detachably coupled to the sealing bracket 30.

In some examples, the sealing bracket 30 is coupled to be detachable from the mask body 10 to separate the sealing bracket 30 from the mask body 10. With this structure, only the sealing bracket 30 is separated, or an assembly of the seal 40 and the sealing bracket 30 is separated from the mask body 10 to clean only the sealing bracket 30 or clean both the sealing bracket 30 and the seal 40.

After the seal 40 is coupled to the sealing bracket 30, when the sealing bracket 30 is coupled to the mask body 10, the seal 40 is stably fixed to the mask body 10.

The sealing bracket 30 can include a sealing insertion portion 301 to which the seal 40 is coupled. The sealing insertion portion 301 can have a flat band shape and thus can be inserted into a groove defined in an inner edge of the seal 40. The sealing insertion portion 301 can be understood as a body of the sealing bracket 30. In detail, it can be understood that an inner edge of the seal 40 is provided in the form of seal lips split into two parts, and the sealing insertion portion 301 is inserted between the seal lips so that the seal 40 and the sealing bracket 30 are coupled to each other.

The sealing insertion portion 301 can be provided in a shape of which a thickness decreases from the inner edge to the outer edge thereof.

The sealing bracket 30 can include the fixing guide 302. The fixing guide 302 can be disposed along the inner edge of the sealing insertion portion 301. The fixing guide 302 can function to set a limit in which the sealing insertion portion 301 is inserted into a groove defined in the inner edge of the seal 40. That is, the fixing position of the inner edge of the seal 40 is determined by the fixing guide 302.

When the inner edge of the seal 40 is in contact with the fixing guide 302, it can be seen that the sealing insertion portion 301 is completely inserted into the seal lips of the seal 40. The fixing guide 302 can be designed to be larger than a thickness of the inner edge of the sealing insertion portion 301.

A portion constituted by the sealing insertion portion 301 and the fixing guide 302 can be defined as a bracket body.

The sealing bracket 30 can include a first body coupling portion 304 coupled to the first bracket coupling portion 103. The first body coupling portion 304 can be provided on an upper portion of the sealing bracket 30. The first body coupling portion 304 can be provided at a position and in number corresponding to the first bracket coupling portion 103. The first body coupling portion 304 can be referred to as an upper body coupling portion. For example, the first body coupling portion 304 can be provided in a hook-fixed shape to which the first bracket coupling portion 103 having the form of a hook is hooked and fixed. The sealing bracket 30 can include a second body coupling portion 305 coupled to the second bracket coupling portion 107. The second body coupling portion 305 can be provided under the sealing bracket 30. The second body coupling portion 305 can be provided at a position and in number corresponding to the second bracket coupling portion 107. The second body coupling portion 305 can be referred to as a lower body coupling portion. For example, the second body coupling portion 305 can be provided in the form of a hook protruding forward from the sealing insertion portion 301.

The sealing bracket 30 can include a bracket insertion portion 306 extending from an inner edge of the bracket body and coupled to the mask body 10. The bracket insertion portion 306 is inserted into a cutoff portion 127 (see FIG. 10) defined in the mask body 10 to shield a portion of an edge of the cutoff portion 127.

The cutoff portion 127 can be understood as an opening communicating with the air duct 120 so that the air passes therethrough. The bracket insertion portion 306 can be disposed on one edge of the cutoff portion 127, specifically, an outer edge.

The air outlet 129 described above can be understood as the remaining portion of the cutoff portion 127 that is not covered by the bracket insertion portion 306 in a state in which the bracket insertion portion 306 is inserted into one side of the cutoff portion 127.

When the bracket insertion portion 306 is inserted into or coupled to the one side of the cutoff portion 127 to shield the one side of the cutoff portion 127, the air discharged from the fan modules 16 and 17 can pass between the air duct 120 and the bracket insertion portion 306 to flow to the air outlet 129.

The bracket insertion portion 306 can serve as a function of fixing the sealing bracket 30 to the mask body 10 while defining one surface of the air duct 120. In detail, an upper portion of the sealing bracket 30 can be fixed to the upper portion of the mask body 10 by the first body coupling portion 304, a lower portion of the sealing bracket 30 can be fixed to the lower portion of the mask body 10 by the second body coupling portion 305, and an intermediate portion of the sealing bracket 30 can be fixed to an intermediate portion of the mask body 10 by the bracket insertion portion 306.

The seal 40 can be made of a material having elasticity. The seal 40 can be in close contact with the user's face and deformed to correspond to an outline of the user's face. The seal 40 can be provided in a ring shape forming a closed loop. The seal 40 can be provided to cover the user's nose and mouth.

Figure 11:
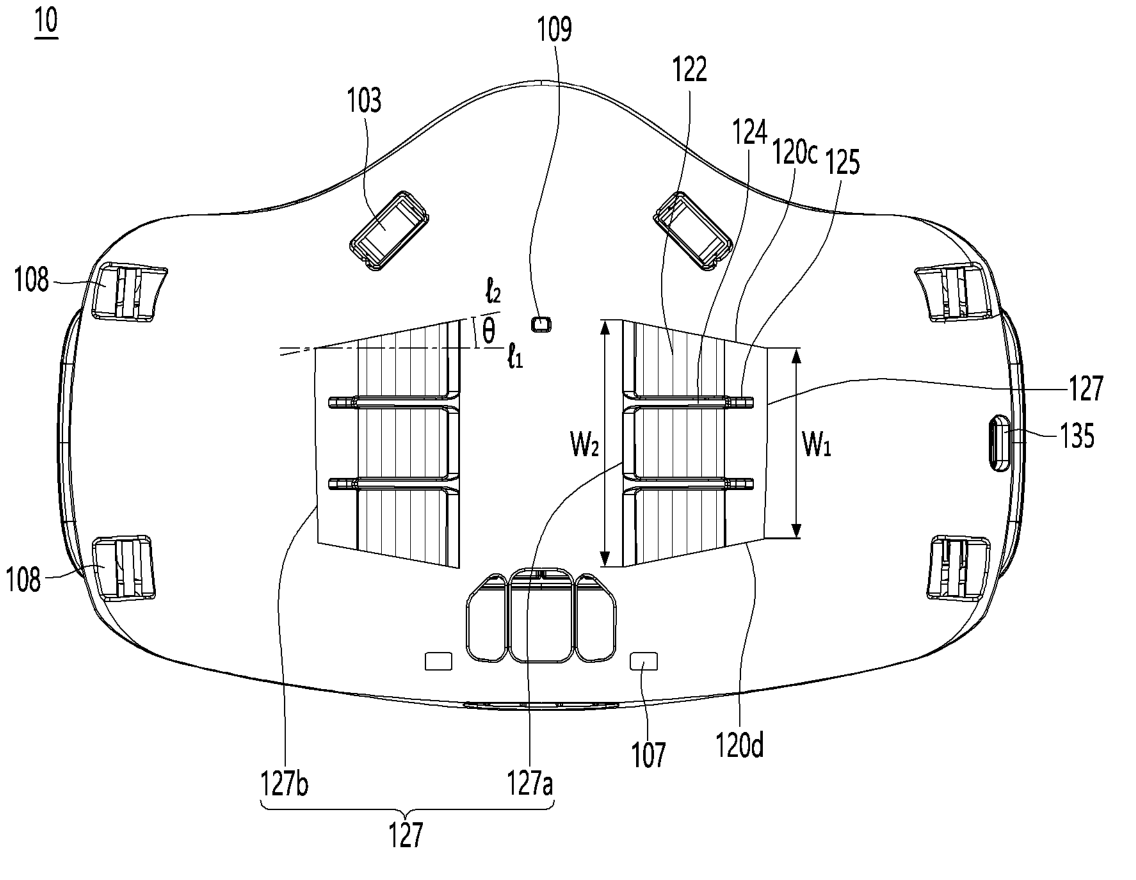
FIG. 11 is a rear view of the mask apparatus.

The seal 40 includes a coupling portion 400*a* coupled to the mask body 10, a side surface portion 400*c* extending from the coupling portion 400*a* toward the user's face, and a contact portion 400*b* that is bent from an end of the side surface portion 400*c* to extend toward the coupling portion 400*a* (see FIG. 11).

The contact portion 400*b* can be a portion that is in close contact with the user's face, and the side surface portion 400*c* and the contact portion 400*b* can be angled at an angle of about 90 degrees or less to define a space between the side surface portion 400*c* and the contact portion 400*b*.

A first opening can be defined inside the coupling portion 400*a*, and a second opening can be defined inside the contact portion 400*b*.

As illustrated in FIG. 3, the second opening can include a main opening in which the front of the user's nose and mouth are disposed and a sub opening extending from an upper end of the main opening and disposed on the user's nose.

In some examples, a lower portion of the main opening, that is, a portion that is in close contact with the front of the user's jaw can be designed closer to the mask body 10 than a portion that is in close contact with the front of the user's cheek.

In some examples, a plurality of ventilation holes are defined in the contact portion 400*b* to minimize a phenomenon in which moisture is generated on the user's cheek. The plurality of ventilation holes can have different sizes, and as an example, a diameter of the ventilation hole can gradually increase from an inner edge to an outer edge of the contact portion 400*b*.

The air outlet 129 and the air exhaust holes 154 and 155 can be provided inside the first opening, and the user's nose and mouth can be disposed inside the second opening.

The seal 40 is disposed between the user's face and the mask body 10, and the breathing space S is defined by the coupling portion 400*a*, the contact portion 400*b*, and the inner side of the side surface portion 400*c* of the seal 40.

The seal 40 can include a bracket insertion groove 401. The bracket insertion groove 401 can be configured so that the sealing insertion portion 301 of the sealing bracket 30 is inserted therein. The bracket insertion groove 401 can be defined in the coupling portion 400*a* of the seal 40. The bracket insertion groove 401 can be defined in an inner edge of the coupling portion 400*a*. The sealing insertion portion 301 of the sealing bracket 30 can be inserted into the bracket insertion groove 401 defined in the coupling portion 400*a* so that the seal 40 and the sealing bracket 30 are coupled to each other.

The seal 40 includes seating grooves 404 and 406, on which the first body coupling portion 304 and the bracket insertion portion 306 are respectively seated, and a through-hole 405 through which the second body coupling portion 305 passes. The seating grooves 404 and 406 and the through-hole 405 can be defined in the coupling portion 400*a*. The seating grooves 404 and 406 can include a first seating groove 404 that is defined in number and position corresponding to the number and position of the first body coupling portion 304 and a second seating groove 406 that is defined in number and position corresponding to the bracket insertion portion 306. The through-hole 405 can be defined in number and at a position corresponding to the second body coupling portion 305.

Figure 6:
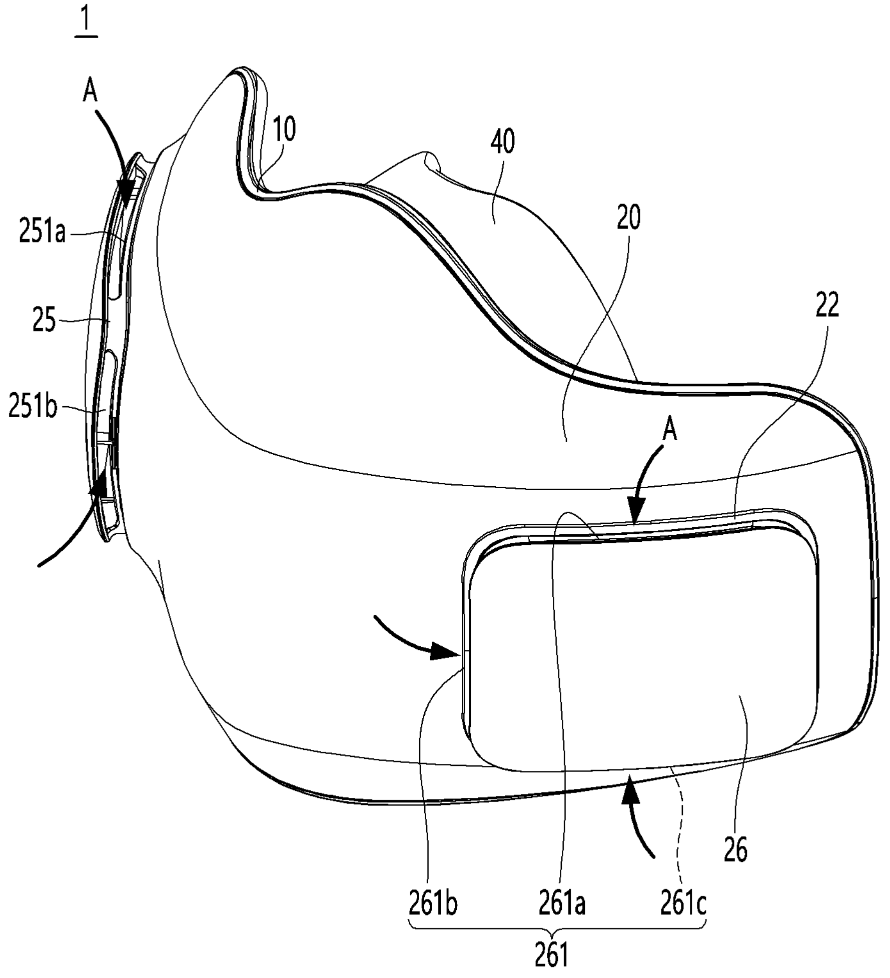
FIGS. 6 and 7 are views illustrating examples of a flow of air when the mask apparatus operates.
Figure 7:
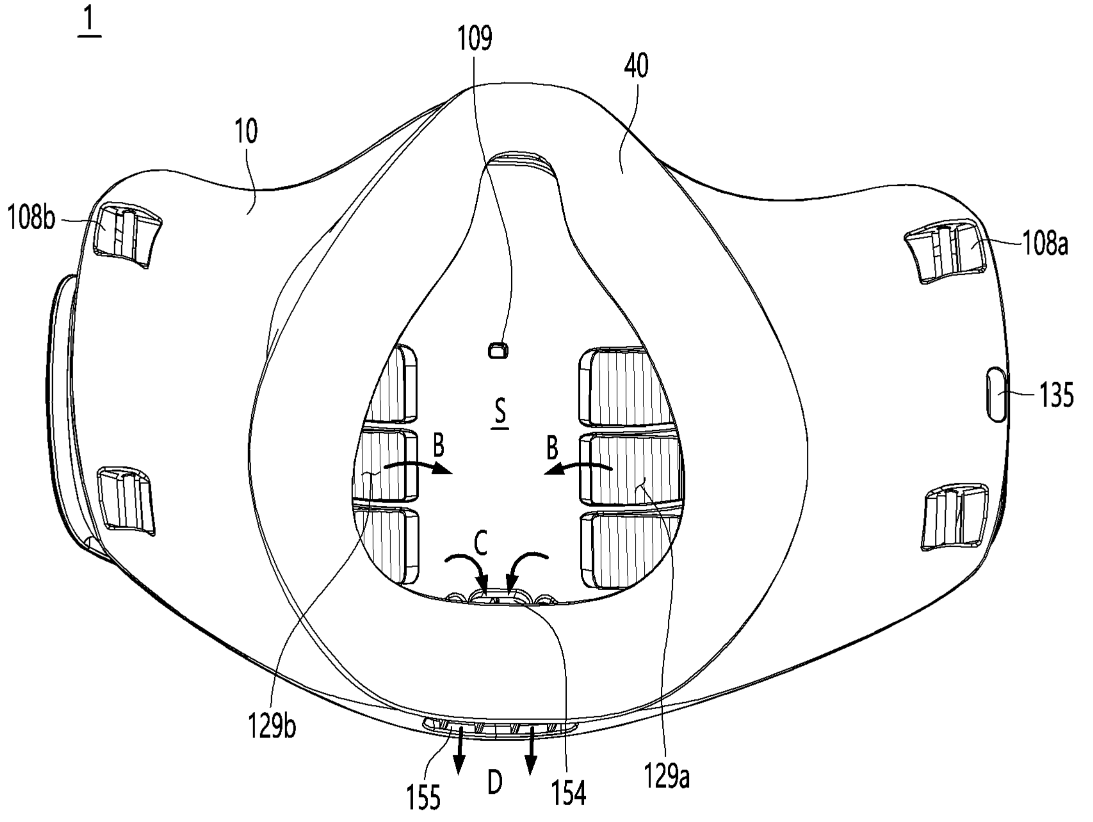

When the first body coupling portion 304, the second body coupling portion 305, and the bracket insertion portion 306 are inserted into the seating grooves 404 and 406 and the through-hole 405, the seal 40 and the sealing bracket 30 can be coupled to be in close contact with each other. FIGS. 6 and 7 are views illustrating a flow of air when the mask apparatus operates.

Referring to FIGS. 6 and 7, the mask apparatus 1 can suction the external air through the air inlets 251 and 261 provided in the filter covers 25 and 26. The flow direction of the external air suctioned into the mask apparatus 1 is indicated by a reference symbol A.

Since the air inlets 251 and 261 are provided in plurality to suction the air in various directions, an inflow rate of the external air increases.

For example, the air inlets 251 and 261 can include air inlets 251*a* and 261*a* for suctioning air flowing at upper sides of the filter covers 25 and 26, air inlets 251*b* and 261*b* for suctioning air flowing at a front side of the filter covers 25 and 26, and air inlets 251*c* and 261*c* for suctioning air flowing at a lower side of the filter covers 25 and 26. The side air inlets 251*b* and 261*b* can be provided at one or both sides of the left and right sides of the filter covers 25 and 26.

Since the filter covers 25 and 26 in which the air inlets 251 and 261 are provided are respectively disposed at left and right sides of the front surface of the mask apparatus 1, the external air can be smoothly suctioned from the left and right sides of the front surface of the mask apparatus 1.

The external air introduced through the air inlets 251 and 261 can be filtered by passing through the filters 23 and 24 disposed inside the filter mounting portions 21 and 22. The filters 23 and 24 can be replaced when the filter covers 25 and 26 are separated from the mask apparatus 1.

The air passing through the filters 23 and 24 can be introduced into the fan inlets of the fan modules 16 and 17 through the air suction holes 211 and 221. In the filter mounting portions 21 and 22, the air suction holes 211 and 221 are defined, and the fan modules 16 and 17 are assembled in the state of being in close contact with each other. Thus, the air passing through the filter may not leak to the outside, and the external air may not be introduced between the filter mounting portions 21 and 22 and the fan modules 16 and 17.

The air discharged through the fan outlets of the fan modules 16 and 17 can pass through the air duct 120 to flow into the breathing space S through the air outlet 129. A flow direction of the air introduced into the breathing space S through the air outlet 129 is indicated by a reference symbol B.

The breathing space can be defined by the mask body 10 and the seal 40. When the mask body 10 is in close contact with the user's face, the seal 40 can be in close contact with the mask body 10 and the user's face to form an independent breathing space that is separated from the external space.

The user inhales after suctioning the filtered air supplied through the air outlet 129 can be exhausted to the external space through the air exhaust holes 154 and 155.

As described above, the air exhaust holes 154 and 155 include a first air exhaust hole 154 communicating with the breathing space and a second air exhaust hole 155 communicating with the external space, and the first air exhaust hole 154 and the second air exhaust hole 155 can communicate with each other by the flow space defined by the air discharge portion 150. The air exhaled by the user can be guided into the flow space through the first air exhaust hole 154. A flow direction of the air flowing into the flow space through the first air exhaust hole 154 is indicated by a reference symbol C.

The air guided into the flow space through the first air exhaust hole 154 can be discharged to the external space through the second air exhaust hole 155. A flow direction of the air discharged into the external space through the second air exhaust hole 155 is indicated by a reference symbol D.

Figure 8:
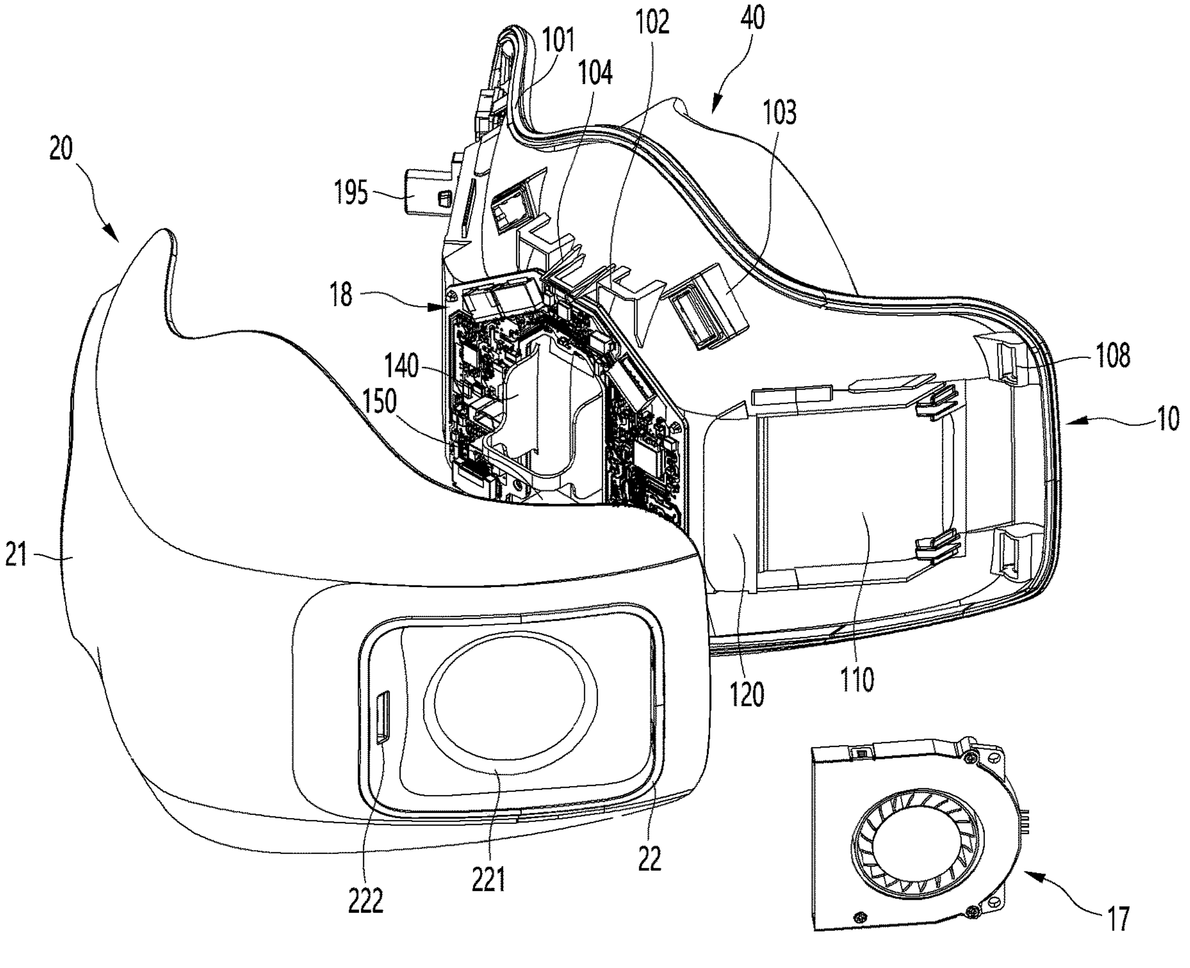
FIG. 8 is a front exploded view of the mask apparatus.
Figure 9:
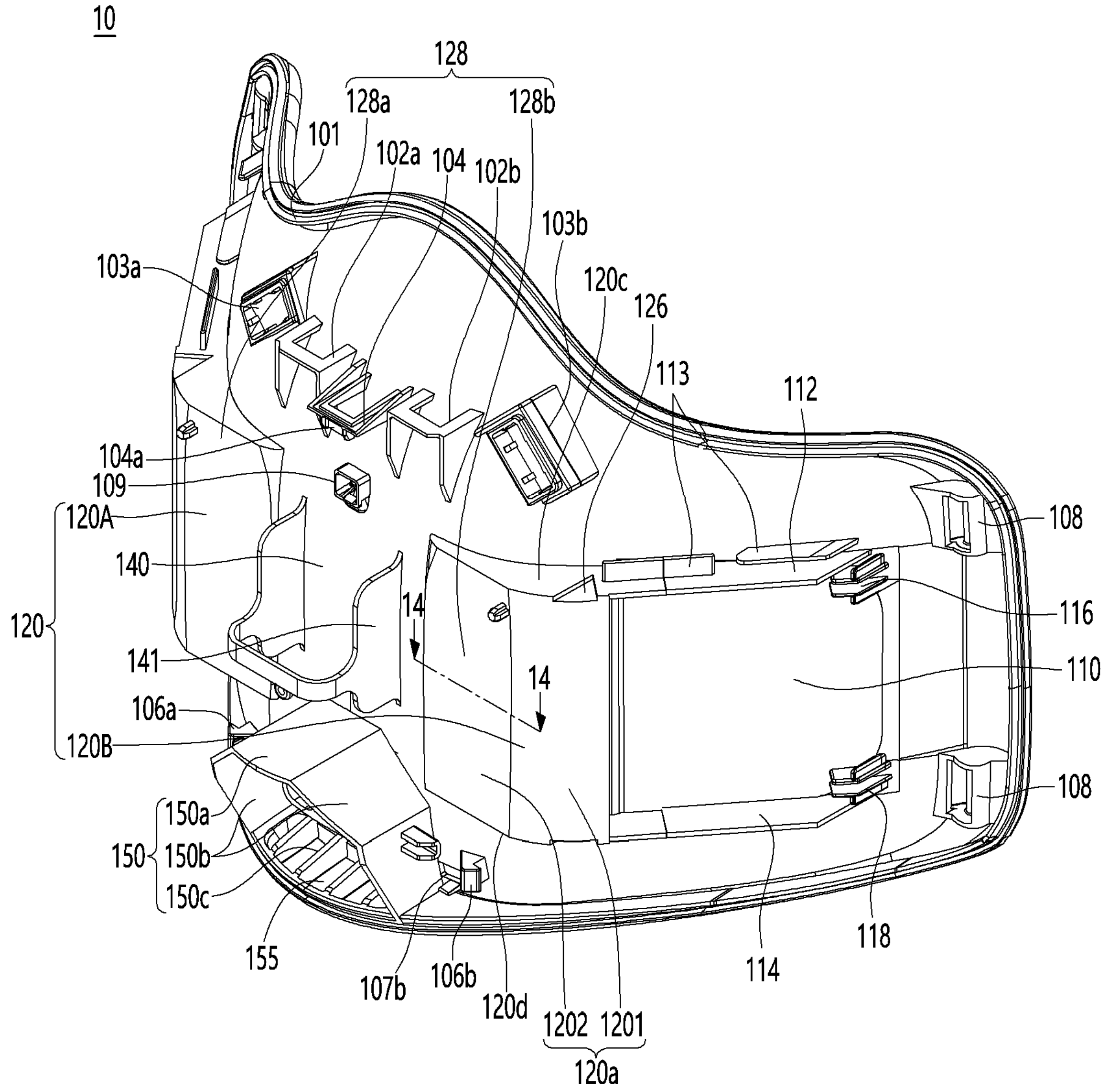
FIG. 9 is a front perspective view showing an example of a mask body.
Figure 10:
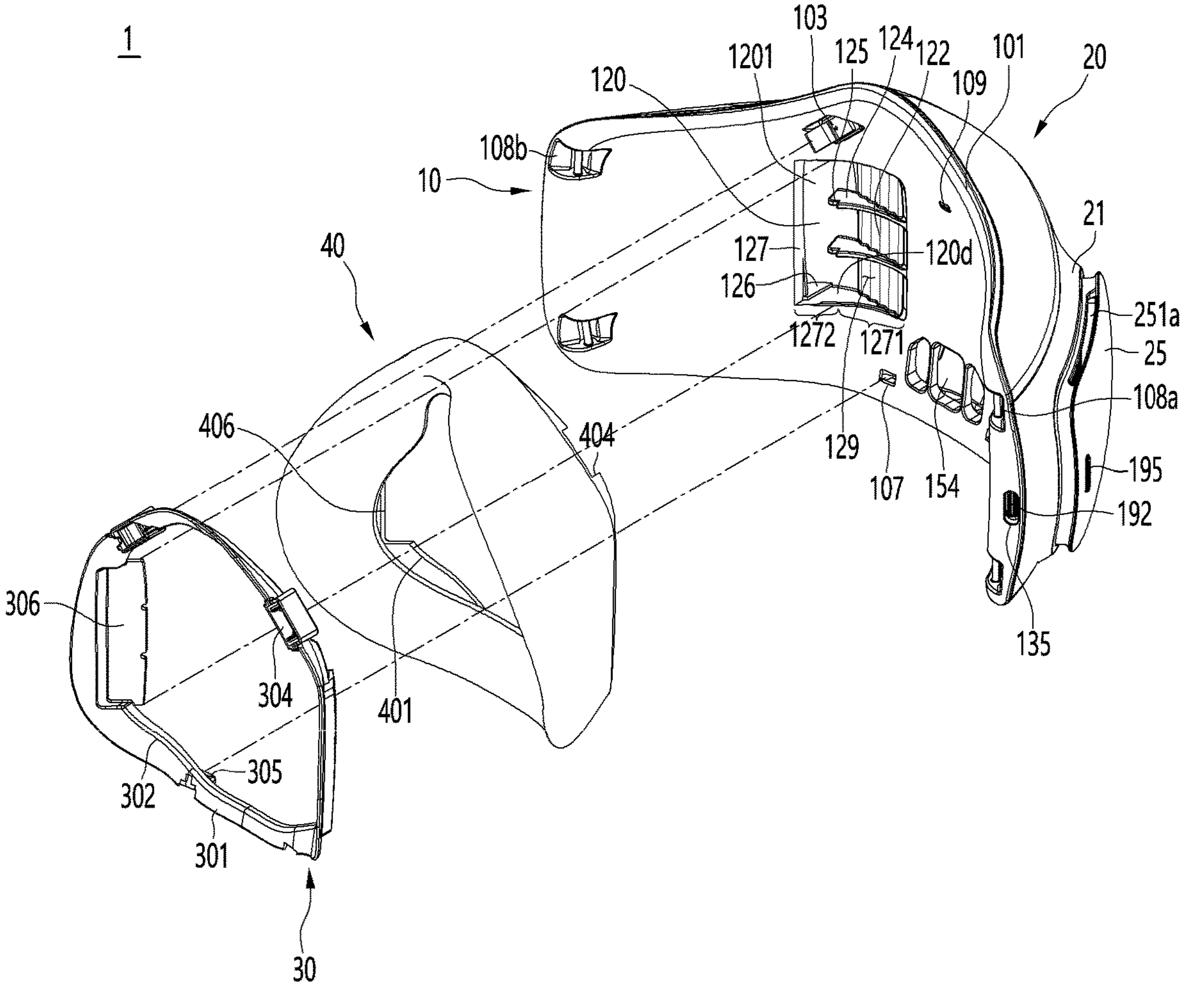
FIG. 10 is a rear exploded view of the mask apparatus.

FIG. 8 is a front exploded view of the mask apparatus, FIG. 9 is a front perspective view of the mask body, and FIG. 10 is a rear exploded view.

Referring to FIGS. 8 to 10, an outer appearance of the mask apparatus 1 can be defined by coupling the mask body 10 to the mask body cover 20. An inner space, in which fan modules 16 and 17, at least a portion or the whole of a power module 19, a control module 18, and a battery are accommodated, can be defined between the mask body 10 and the mask body cover 20.

At least a portion or the whole of the fan modules 16 and 17, the power module 19, the control module 18, and the battery accommodated in the inner space can be fixed to the front surface of the mask body 10. Alternatively, the fan modules 16 and 17 can be fixed to the front surface of the mask body 10, and the power module 19, the control module 18, and the battery can be fixed to the rear surface of the mask body cover 20.

The seal 40 can be fixed to the rear surface of the mask body 10 by the sealing bracket 30. A breathing space S is defined inside the seal 40, and when the seal 40 is in close contact with the user's face, the mouth and nose of the user are accommodated in the breathing space S.

The breathing space S communicates with the air outlet 129 and the air exhaust holes 154 and 155 of the mask body 10. The air introduced into the breathing space S through the air outlet 129 can be inhaled by the user, and the air collected in the breathing space S when the user exhales can be discharged to the external space through the air exhaust holes 154 and 155.

The seal 40 can be deformed between the mask body 10 and the user's face to be in close contact between the mask body 10 and the user's face.

The mask body 10 can include a support rib 104. The support rib 104 allows the mask body 10 and the mask body cover 20 to be coupled in a state of being spaced apart from each other. In some implementations, the support rib 104 can further include a fixing hook 104*a* for supporting one side of the control module 18. In detail, the fixing hook 104*a* can be hung on an upper end of the control module 18 so that an upper portion of the control module 18 is supported by the support rib 104.

The mask body 10 can include a fan module mounting portion 110.

The fan module mounting portion 110 can include a first fixing rib 112 and a second fixing rib 114. The first fixing rib 112 and the second fixing rib 114 can support top and bottom surfaces of the fan modules 16 and 17, respectively. The first fixing rib 112 and the second fixing rib 114 can protrude forward from the front surface of the mask body 10, and the fan modules 16 and 17 can be accommodated between the first fixing rib 112 and the second fixing rib 114.

The air duct 120 can be disposed at one end of each of the first fixing rib 112 and the second fixing rib 114, and a coupling portion for fixing a portion of each of the fan modules 16 and 17 can be disposed at the other end of each of the first fixing rib 112 and the second fixing rib 114.

The fan module mounting portion 110 can include a cable fixing rib 113. The cable fixing rib 113 can be provided on a top surface of the first fixing rib 112 and the front surface of the mask body 10. The cable fixing rib 113 can be provided to fix a cable extending from the control module 18 toward the fan modules 16 and 17, the power module 19, and the like.

The cable fixing rib 113 can include a first cable fixing rib provided on a top surface of the first fixing rib 112 or a bottom surface of the second fixing rib 114 and a second cable fixing rib provided on the front surface of the mask body 10.

The first cable fixing rib and the second cable fixing rib are spaced apart from each other in the widthwise direction of the mask body 10. In some examples, the first and second cable fixing ribs can protrude in a direction crossing each other and can extend in the width direction of the mask body 10. A portion of the cable can be fixed by the first cable fixing rib, and a remaining portion of the cable can be fixed by the second cable fixing rib.

The fan module mounting portion 110 can include fan module coupling portions 116 and 118. The fan module coupling portions 116 and 118 can be provided in plurality. The fan module coupling portions 116 and 118 can be portions for supporting the edges of the fan modules 16 and 17 mounted on the fan module mounting portion 110, and thus, a coupling member passing through the edges of the fan modules 16 and 17 can be inserted into the fan module coupling portions 116 and 118.

The fan module coupling portions 116 and 118 can protrude from the front surface of the mask body 10. A coupling hole into which the coupling member is inserted can be defined in each of the fan module coupling portions 116 and 118. Alternatively, the fan module coupling portions 116 and 118 can be provided in a pair of coupling ribs facing each other, and the coupling member can be inserted into a space defined between the pair of coupling ribs.

The fan module coupling portions 116 and 118 can include a first side coupling portion 116 and a second side coupling portion 118. The first side coupling portion 116 and the second side coupling portion 118 can be provided to be spaced apart from each other in a height direction (upward and downward direction) perpendicular to the width direction of the mask body 10 to support upper and lower sides of the side ends of the fan modules 16 and 17.

An inclined surface can be provided on each of the fan module coupling portions 116 and 118. The inclined surface can be provided to be inclined upward from an outer edge (an edge close to the side end of the mask body) to an inner edge (an edge close to the center of the mask body) of the fan module mounting portion 110. Thus, the fan modules 16 and 17 can be slid from the side end of the mask body 10 toward a center along the inclined surface so as to be in close contact with a suction end of the air duct 120.

The air duct 120 can be established by a front surface portion 120*a* provided on the front surface of the mask body 10, a rear surface portion 120*b* facing the front surface portion and provided on the rear surface of the mask body 10, and top and bottom surface portions 120*c* and 120*d* that connect the front surface portion 120*a* to the rear surface portion 120*b*.

The top surface portion 120*c* and the bottom surface portion 120*d* can extend in a direction crossing the front surface portion 120*a* at the upper and lower ends of the front surface portion 120*a* and be defined as a first connection portion 120*c* and a second connection portion 120*d*, which are respectively disposed at upper and lower sides. In some examples, the rear surface portion 120*b* can include an opened surface or the cutoff portion 127.

The front surface portion 120*a* is again constituted by a curved portion 1201 and a flat portion 1202, and the flat portion 1202 can be defined as the control module mounting portion 128 as described above.

Since the side surface portion of the air duct 120 is opened, external air can be introduced through the opened side surface portion. In some examples, since the discharge ports of the fan modules 16 and 17 are in contact with the opened side surface, the opened side surface can be defined as the fan module insertion hole 123 (see FIG. 14). Alternatively, the opened side surface portion can be defined as an inlet of an air passage provided inside the air duct 120.

A portion of the rear surface portion 120*b* can be shielded by the bracket insertion portion 306, and the rest of the rear surface portion 120*b* except for the portion shielded by the bracket insertion portion 306 can be defined as an air outlet 129.

In detail, the side surface portion of the air duct 120, that is, a front end of the fan module insertion hole 123 can be connected to one side end of the front surface portion 120*a*, and a rear end of the fan module insertion hole 123 can be connected to one side end of the rear surface portion 120*b*.

In some examples, the other side end of the front surface portion 120*a* can be connected to the other side end of the rear surface portion 120*b* so that the air duct 120 has a shape having one side portion.

The front surface portion 120*a* can be a portion of the mask body 10 that protrudes forward.

An uneven portion 122 can be disposed on the rear end of the flat portion 1202.

The uneven portion 122 can be a plurality of protrusions or ribs that protrude from the rear surface of the flat portion 1202 to extend vertically and are spaced apart from each other in a width direction (lateral direction) of the mask body 10.

The air discharged from the fan modules 16 and 17 can pass through the air duct 120 and be introduced into the breathing space. In detail, the air discharged from the fan modules 16 and 17 can flow in a laminar flow manner between the curved portion 1201 and the bracket insertion portion 306. The air passing between the curved portion 1201 and the bracket insertion portion 306 can flow in the laminar flow manner due to a flow velocity of air forcedly flowing by the fan modules 16 and 17.

The air flowing in a laminar flow manner can be guided by the curved portion 1201 to flow toward the uneven portion 122 of the flat portion 1202. The air flowing in the laminar flow manner can be converted into a turbulent flow while passing through the uneven portion 122 of the flat portion 1202.

The air converted from the laminar flow to the turbulent flow by the uneven portion 122 can pass through the air outlet 129 and be discharged into the breathing space. When the air flow is converted from the laminar flow into the turbulent flow by the uneven portion 122, noise can be reduced while the flow rate of the air supplied to the breathing space S through the air outlet 129 increases. In some examples, the air converted from the laminar flow to the turbulent flow can be efficiently supplied to the breathing space because a diffusion effect is very strong.

The air duct 120 can include a division portion 124. The division portion 124 can protrude from a rear surface of the front surface portion 120*a* to extend in a flow direction of the suctioned air. In some examples, a plurality of division portions 124 can be spaced apart from each other in the vertical direction of the front surface portion 120*a*. As a result, the air passing through the air duct 120 can be divided into a plurality of passages by the plurality of division portions 124 and then be introduced into the breathing space.

The division portion 124 can extend up to an inner side end of the front surface portion 120*a* at a point that is spaced a predetermined distance from an outer side end (an edge in which the fan module insertion hole is defined) of the front surface portion 120*a* in the flow direction of the air.

The division portion 124 can include a bracket coupling groove 125. The bracket insertion portion 306 of the sealing bracket 30 can be disposed in the bracket coupling groove 125.

The bracket coupling groove 125 can be defined by recessing or stepping an end of the division portion 124. When the bracket insertion portion 306 is disposed in the bracket coupling groove 125, an edge of the bracket insertion portion 306 can be supported by the division portion 124. The cutoff portion 127 can be divided into a second space 1272 into which the bracket insertion portion 306 is inserted and a first space 1271 through which air is discharged by the bracket coupling groove 125.

The air duct 120 can include a fan module support 126. The fan module support 126 is provided to be recessed or stepped in a central direction of the air duct 120 from the top surface portion 120*c* and the bottom surface portion 120*d* of the air duct 120, respectively (see FIG. 9). An outer end of the fan module support 126 can include a protrusion that limits the fan modules 16 and 17 from being excessively inserted into the inside of the air duct 120 through the fan module insertion hole 123. In some examples, an inner end of the fan module support 126 is provided to be inclined as illustrated in the drawings to function as a support protrusion that supports the bracket insertion portion 306. Thus, the fan module support 126 can be defined as a bracket support.

The top surface portion 120*c* and the bottom surface portion 120*d* can be connected to the first fixing rib 112 and the second fixing rib 114, respectively.

The mask body 10 can include a cutoff portion 127. The cutoff portion 127 can be defined by cutting a portion of the mask body 10. The cutoff portion 127 can be understood as an opening defined by cutting a portion of the rear surface of the mask body 10 to connect the air duct 120 provided to the mask body 10 to the breathing space S. Although referred to as a cutoff portion In some implementations, it can be defined as an opening or a hole, and the cutoff portion can be understood as an outlet of the air duct 120.

As illustrated in FIG. 9, the air duct 120 can include a first air duct 120A and a second air duct 120B. As illustrated in FIG. 11, the cutoff portion 127 can include a first cutoff portion 127*a* communicating with the first air duct 120A and a second cutoff portion 127*b* communicating with the second air duct 120B. The first cutoff portion 127*a* can be provided at either side of the left or right from the center of the mask body 10, and the second cutoff portion 127*b* can be provided at the other of the left and right from the center of the mask body 10.

In more detail, the first air duct 120A and the first cutoff portion 127*a* can be disposed between the center of the mask body 10 and the first fan module 16, and the second air duct 120B and the second cutoff portion 127*b* can be disposed between the center of the mask body and the second fan module 17.

The cutoff portion 127 can include a first space 1271 corresponding to the air outlet 129 and a second space 1272 into which the bracket insertion portion 306 of the sealing bracket 30 is shielded. The first space 1271 can be defined as a discharge space through which the air flows. The second space 1272 can be defined as a mounting space into which the bracket insertion portion 306 is disposed.

Since the bracket insertion portion 306 is inserted into the second space, an effect of extending the air passage can be obtained in addition to the effect of stably supporting the central portion of the seal 40.

In detail, when the bracket insertion portion 306 is placed in the second space 1272, and the second space 1272 is shielded, an outlet of the air duct 120 can decrease, but the effect of extending the air passage can be obtained. Accordingly, most of the inhaled air is concentrated to the user's nose and mouth, and an amount of air distributed toward the user's cheeks can be minimized.

In some implementations, the rear surface portion 120*b* can be divided into the first space 1271 and the second space 1272. When the bracket insertion portion 306 is not inserted, the second space 1272 together with the first space 1271 can be also defined as a portion of the air outlet 129. That is, it can be understood that the entire rear portion 120*b* can function as the air outlet 129.

The air discharge portion 150 protruding from a lower portion of the front surface of the mask body 10 can define a flow space for discharging air to an external space.

The air discharge portion 150 can include an upper side surface (or upper surface) 150*a*, a lower side surface (or lower surface) 150*c*, and both side surfaces 150*b*. The upper side surface 150*a*, the lower side surface 150*c*, and both side surfaces 150*b* can protrude forward from the front surface of the mask body 10. The upper side surface 150*a* defines a top surface of a flow space, the lower side surface 150*c* defines a bottom surface of the flow space, and both side surfaces 150*b* define both side surfaces of the flow space.

Figure 12:
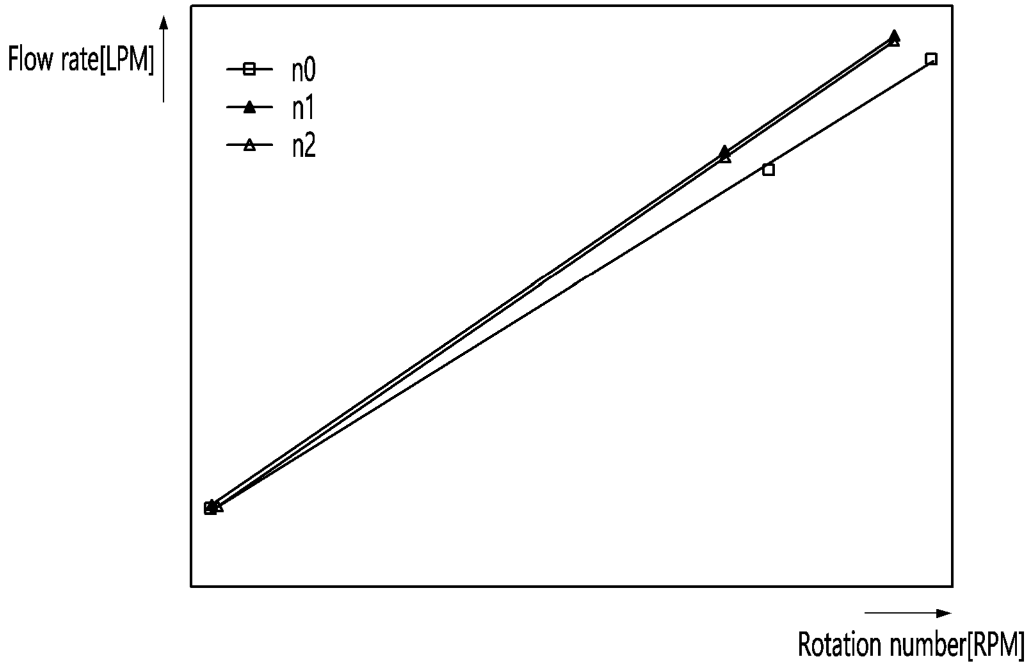
FIG. 12 is a graph illustrating an example of a change of a flow rate with respect to a change of a number of rotation of a fan.
Figure 13:
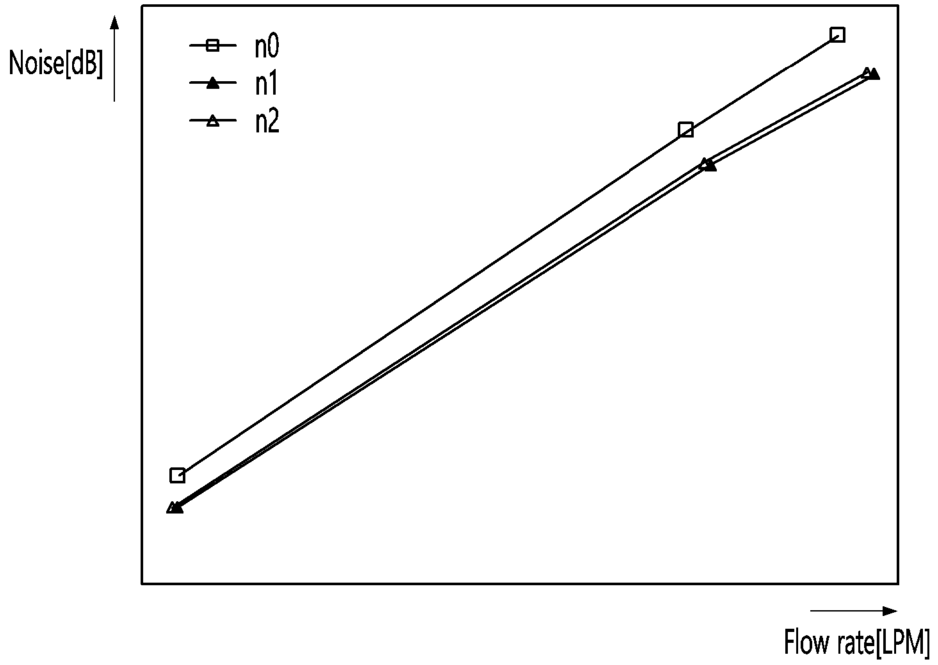
FIG. 13 is a graph illustrating an example of a change of noise with respect to a change of a flow rate of air.

FIG. 11 is a rear view of the mask apparatus, FIG. 12 is a graph illustrating a change in flow rate with respect to a change in number of rotation, and FIG. 13 is a graph illustrating a change in noise with respect to a change in flow rate.

Referring to FIGS. 11 to 13, the air duct 120 can increase in cross-sectional area from the fan module insertion hole 123 toward the air outlet 129.

The fan module insertion hole 123 can be defined as an inlet side or duct inlet of the air duct 120, and the air outlet 129 can be defined as an outlet side or duct outlet of the air duct 120. The air duct 120 can be provided in a shape in which a flow cross-sectional area increases from the inlet side toward the outlet side.

In some implementations, the cross-sectional area of the outlet can be greater than the cross-sectional area of the inlet of the air duct 120. In some examples, a length of the inner edge can be greater than a length of the outer edge of the outlet. In other words, the length of the inner side end that is close to the center of the mask apparatus can be greater than the length of the outer side end that is close to the side end of the mask apparatus.

For example, the cutoff portion 127 can include an inner side end that is disposed adjacent to a center axis of the mask body and extend along the center axis, and an outer side end that is disposed away from the center axis relative to the inner side end and extends along the center axis. An extension length (W2) of the inner side end along the center axis can be greater than an extension length (W1) of the outer side end along the center axis. The center axis can extend vertically through the sensor mounting portion 109 and the air discharge portion 150.

The flow cross-sectional area can be defined by a height indicating a distance between the front surface portion 120*a* and the rear surface portion 120*b*, and a width indicating a distance between the top surface portion 120*c* and the bottom surface portion 120*d*. In some implementations, the air duct 120 can be configured in that the width which is a distance between the top surface portion 120*c* and the bottom surface portion 120*d* increases.

The flow cross-sectional area at the outlet side can be greater than the flow cross-sectional area at the inlet side by the width that increases from the inlet side to the outlet side of the air duct 120. The width at the inlet side of the air duct 120 is defined as a first width W1, and the width at the outlet side is defined as a second width W2. The second width W2 can be greater than the first width W2. The increase in flow cross-sectional area from the inlet side to the outlet side of the air duct 120 can be referred to as a diffuser structure or a diffuser pipe structure.

According to the structure, since a flow speed of air at the outlet side is lower than a flow velocity of air at the inlet side, the air can be supplied to the user in a state in which a discharge pressure of the air discharged from the fan modules 16 and 17 is reduced. That is, since a pressure in the breathing space is reduced, there is an advantage that the user's breathing is smooth.

A first virtual line l1 extending in parallel to a flow direction of air discharged from the inlet side of the air duct 120 and a second virtual line l2 extending in parallel to the top surface portion 120*c* or the bottom surface portion 120*d*, which extends from the inlet side to the outlet side of the air duct 120 can be provided. The second virtual line can have a predetermined angle θ with respect to the first virtual line. In some implementations, the predetermined angle can range of about 20 degrees to about 40 degrees. An angle defined by the first virtual line and the second virtual line can be referred to as a diffuser angle.

The air passing through the air duct 120 can flow from the inlet side having a first width W1 to the outlet side having a second width W2, a flow speed of air can be effectively reduced by the increasing flow cross-sectional area, a static pressure can increase to allow the air discharged from the air outlet 129 to be quickly diffused into the breathing space.

In some implementations, each of the top surface portion 120*c* and the bottom surface portion 120*d* are described as being provided as a flat surface, but each of the top surface portion 120*c* and the bottom surface portion 120*d* can be provided as a curved surface.

In some implementations, since the air is uniformly diffused and supplied to the breathing space, breathing discomfort caused by excessive supply of the air can be eliminated.

When explaining the increase in flow cross-sectional area according to another aspect, the air outlet 129 can have a shape having a length (or width) that gradually increases from the outer edge that is close to the side end of the mask body 10 toward the inner edge that is close to the center of the mask body 10. That is, it can be described that the air outlet 129 has a trapezoidal shape.

FIG. 12 is a graph of results obtained by measuring a flow rate of air flowing from the inlet to the outlet of the air duct 120 by changing the number of rotation of the fan after adjusting a diffuser angle of the air duct 120.

Examples of the angle of the diffuser include an n0 value angle, an n1 value angle obtained by adding an angle from the ns value angle, and an n2 value angle obtained by adding an angle from the n1 value angle. The n value angle is 0 degree, the n1 value angle is about 30 degrees, and the n2 value angle is about 40 degrees.

When the angle of the diffuser is 0 degree, the diffuser structure may not be applied to the air duct 120. As the angle of the diffuser increases, the flow rate of the air passing through the air duct 120 increases compared to a structure in which the diffuser angle is 0 at the same rotational number. In some examples, the flow rate increases when the diffuser angle is about 30 degrees compared to a case in which the diffuser angle is about 40 degrees at the same rotational speed.

When the diffuser angle is close to 0, a difference between the flow cross-sectional area of the air duct 120 between the inlet side and the outlet side is not large, and thus an effect obtained by the diffuser or the diffuser pipe structure can be insufficient. As the diffuser angle increases from 0, the air diffusion effect obtained by the diffuser or diffuser pipe structure can also increase.

That is, it is seen that the flow rate of the air passing through the air duct 120 increases until the diffuser angle reaches a specific angle under the same rotational number, but the flow rate of the air passing through the air duct 120 decreases rather above the specific angle under the same rotational number.

This is because air introduced from the inlet side of the air duct 120 is far apart from the top surface portion 120*c* and the bottom surface portion 120*d* of the air duct at the specific diffuser angle, and thus, it is believed that this is because an interference between the air and the air duct is minimized.

FIG. 13 is a graph of results obtained by measuring noise that is changed according to a change in flow rate after the diffuser angle of the air duct 120 is adjusted.

As the flow rate increases, the noise can also increase. As the flow rate increases, the noise can also increase. As the flow rate increases, an amount of air passing through the air duct 120 increases. Thus, as the amount of air flowing increases, the air flow noise can increase.

As the diffuser angle increases, the noise generated at the same flow rate decreases. As the diffuser angle increases, the flow cross-sectional area of the outlet side of the air duct 120 increases rather than the inlet side, and thus, the discharge pressure of the air can be changed according to the increase in flow cross-sectional area to reduce the discharge noise.

The noise is further reduced when the diffuser angle is about 30 degrees and about 40 degrees compared to a case in which the diffuser angle is 0 degree. However, the noise detected at the diffuser angle of about 40 degrees at the same flow rate is slightly reduced than that detected at the diffuser angle of about 30 degrees. When the diffuser angle is greater than or equal to a predetermined angle, a vortex or swirling wind can be generated at the outlet side of the air duct 120, and the noise reduction effect can be reduced by the vortex or swirling wind. If the noise reduction effect is reduced, the generated flow noise can increase again.

That is, the noise reduction effect can also increase so a predetermined diffuser angle increases, but the reduction effect can be reduced over the predetermined angle, compared to the increasing flow rate. Furthermore, as the diffuser angle approaches 0, the flow rate of flowing air can increase, but the generated flow noise can also increase.

Therefore, In some implementations, the diffuser angle is proposed to be about 20 degrees to 40 degrees.

Figure 14:
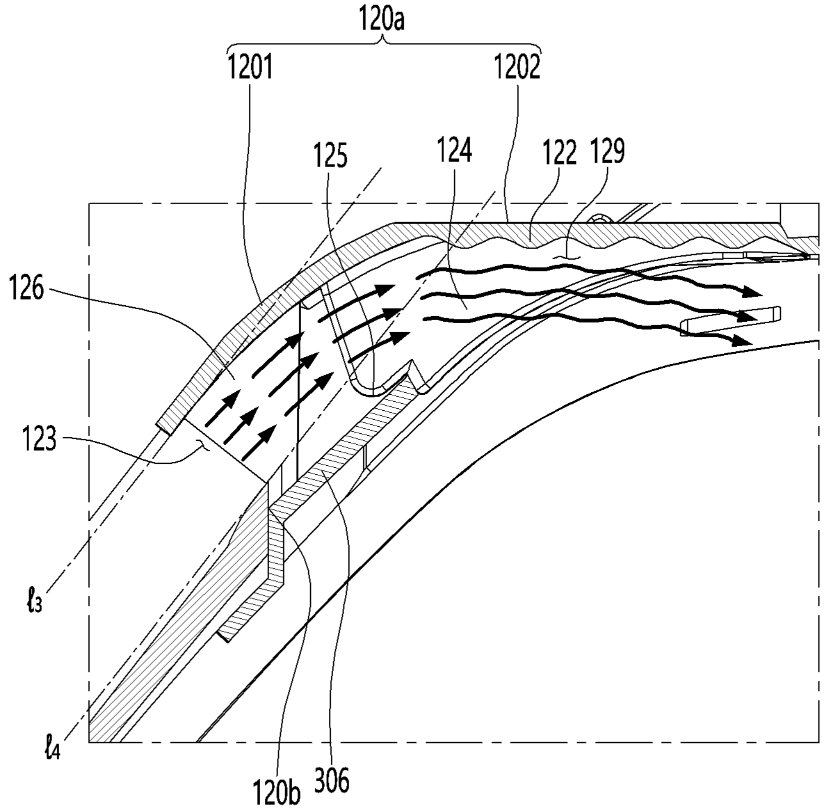
FIG. 14 is a transverse cross-sectional view taken along 14-14 of FIG. 9.
Figure 15:
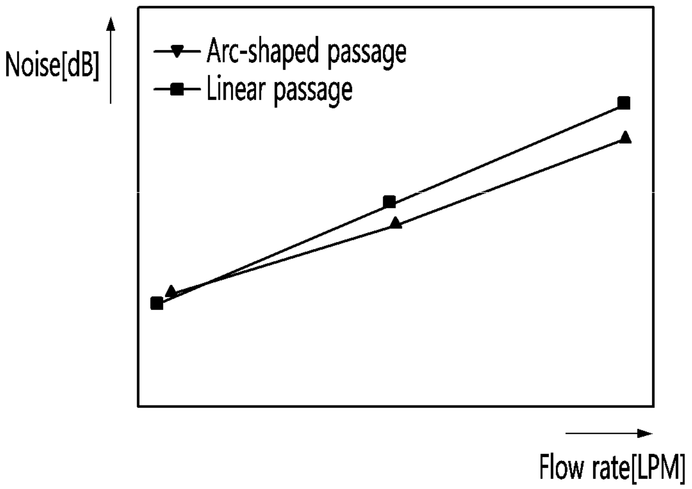
FIG. 15 is a graph illustrating an example of a relationship between a flow rate and noise according to a difference in shape of the air duct.
Figure 16:
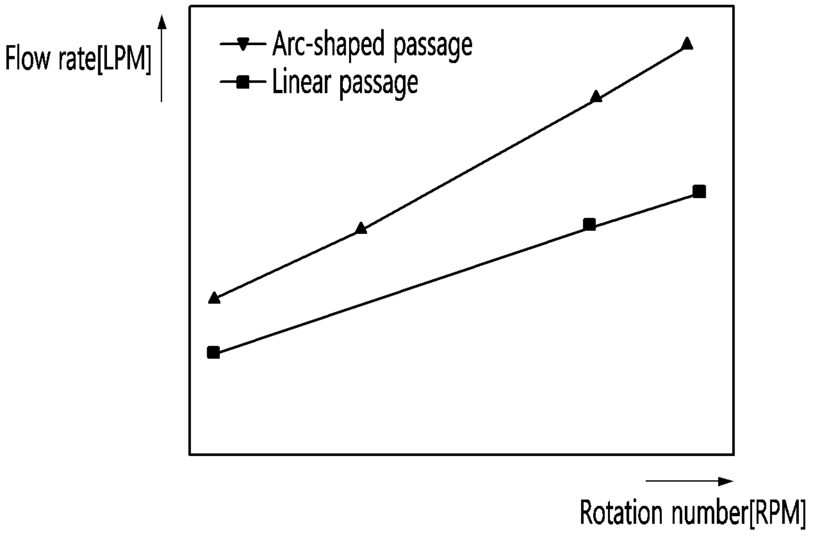
FIG. 16 is a graph illustrating an example of a relationship between a number of rotation and a flow rate according to a difference in shape of the air duct.

FIG. 14 is a transverse cross-sectional view taken along 14-14 of FIG. 9, FIG. 15 is a graph illustrating a relationship between a flow rate and noise according to a difference in shape of the air duct, and FIG. 16 is a graph illustrating a relationship between a rotation number and a flow rate according to a difference in shape of the air duct.

Referring to FIGS. 14 to 16, air flowing from an inlet side to an outlet side of an air duct 120 according to another implementation can pass between a front surface portion 120*a* and a rear surface portion 120*b* of the air duct 120.

An uneven portion 122 can be provided on a rear surface of a flat portion 1202 of the front surface portion 120*a* of the air duct 120.

The front surface portion 120*a* of the air duct 120 and a bracket insertion portion 306 covering the rear surface portion 120*b* can be connected to a top surface portion 120*c* and a bottom surface portion 120*d* to provide an air passage through which air passes.

The air passing through the air duct 120 can be converted in air flow direction toward an air outlet 129 by the curved portion 1201 and also be converted in air flow characteristic by the uneven portion 122. The curved portion 1201 can be provided at a gentle angle so that the change in flow speed is small. The curved portion 1201 can be provided in a shape that is rounded with a predetermined curvature. An angle defined by a virtual line (l3 or l4) extending in a direction perpendicular to a surface passing through an inlet of the air duct 120 and a straight line connecting a start point and an end point of the curved portion 1201 is approximately 30 degrees.

Air passing through the curved portion 1201 can be guided to the uneven portion 122. The air passing through the curved portion 1201 can be changed from a laminar flow to a turbulent flow while passing through the uneven portion 122.

Since the air flow is converted from the laminar flow to the turbulent flow, discharge noise of air discharged from the air outlet 129 can be reduced, and the flow rate of air passing through the outlet side of the air duct 120 can be reduced by the reduced discharge pressure and the increasing flow cross-sectional area by the turbulent flow of air can increase.

Referring to FIG. 15, as a result of comparing the flow rate of air flowing along the air duct having the curved portion and the air duct having only a linear portion, it can be seen that the noise generated by the air flowing along an arc-shaped passage having the curved portion is less than noise generated by the air flowing the linear passage under the same air flow rate.

When the air having a low flow rate passes through the air duct, the noise generated in the linear passage is less than the noise generated in the arc-shaped passage, but as the flow rate increased, the increase of the noise generated in the arc-shaped passage is less than an increase of the noise generated in the linear passage.

Referring to FIG. 16, it can be seen that the flow rate of air flowing along the passage having the curved portion 1201 is greater than the flow rate of air flowing along the passage having only the linear portion under the condition in which the rotation speed of the fan is set equally.

In some examples, as the number of rotation of the fan increases, an increase in flow rate of air flowing along the passage having the curved portion 1201 is greater than the increase in flow rate of air flowing along the passage having only the linear portion.

In some implementations, the curved portion 1201 can be provided on the front surface portion 120*a* of the air duct 120 and further include an uneven portion 122. In some examples, the uneven portion 122 may not be provided in the curved portion 1201.

What is claimed is:

1. A mask apparatus comprising:
- a mask body;
- a seal disposed at a rear surface of the mask body and configured to contact a user's face, the seal defining a breathing space configured to accommodate the user's mouth or nose or both based on the seal contacting the user's face;
- a fan module disposed at a front surface of the mask body and configured to receive external air, the fan module defining a fan outlet configured to discharge the external air toward the breathing space; and
- a mask body cover that covers the fan module and is coupled to the front surface of the mask body,
- wherein the mask body comprises:
  - an air duct configured to guide the external air from the fan module to the breathing space, the air duct having (i) a duct inlet configured to communicate with the fan outlet and (ii) a duct outlet configured to communicate with the breathing space, and
  - an air exhaust hole configured to discharge air exhaled into the breathing space to an outside of the mask body,
- wherein an area of the duct outlet is greater than an area of the duct inlet, and
- wherein the air duct comprises:
  - a front surface portion spaced apart from the front surface of the mask body and disposed forward relative to the front surface of the mask body,
  - a side surface portion that is disposed at a side end of the front surface portion and defines the duct inlet,
  - a top surface portion that connects an upper end of the front surface portion of the air duct to the front surface of the mask body,
  - a bottom surface portion that connects a lower end of the front surface portion of the air duct to the front surface of the mask body, and
  - a cutoff portion that defines the duct outlet, the cutoff portion being defined by a rear end of the side surface portion, a rear end of the top surface portion, a rear end of bottom surface portion, and a rear side of the front surface portion.

2. The mask apparatus according to claim 1, wherein the cutoff portion comprises:
- an inner side end that is disposed adjacent to a center axis of the mask body and extends along the center axis; and
- an outer side end that is disposed away from the center axis relative to the inner side end and extends along the center axis, and
- wherein an extension length of the inner side end along the center axis is greater than an extension length of the outer side end along the center axis.

3. The mask apparatus according to claim 2, wherein the front surface portion of the air duct comprises:
- a curved portion that extends from the duct inlet toward the center axis of the mask apparatus, the curved portion having a predetermined curvature; and
- a flat portion that extends from an end of the curved portion toward the center axis of the mask apparatus.

4. The mask apparatus according to claim 3, wherein the flat portion comprises an uneven portion disposed on a rear surface of the flat portion.

5. The mask apparatus according to claim 4, wherein the uneven portion comprises convex portions and concave portions that are alternately arranged along a flow direction of air in the air duct and that extend in a direction crossing the flow direction of air in the air duct.

6. The mask apparatus according to claim 5, wherein the mask body further comprises a plurality of division portions that protrude from the rear side of the front surface portion of the air duct, the plurality of division portions being configured to divide a flow of the external air introduced into the air duct.

7. The mask apparatus according to claim 6, wherein the plurality of division portions extend along the flow direction of air in the air duct and are disposed between the upper end of the front surface portion and the lower end of the front surface portion, the plurality of division portions being spaced apart from one another by a predetermined distance.

8. The mask apparatus according to claim 7, further comprising a sealing bracket that couples the seal to the rear surface of the mask body, the sealing bracket comprising:

a bracket body having a band shape that extends along the seal; and a bracket insertion portion that extends from an inner edge of the bracket body.

9. The mask apparatus according to claim 8, wherein the cutoff portion comprises:

a first space including the duct outlet, the first space being in communication with the air duct and the breathing space; and a second space that is covered by the bracket insertion portion and defines a portion of the rear surface of the air duct.

10. The mask apparatus according to claim 8, wherein each of the plurality of division portions comprises a bracket coupling groove that supports the bracket insertion portion.

11. The mask apparatus according to claim 8, further comprising a fan module support that is recessed from each of the top surface portion and the bottom surface portion toward the duct inlet, the fan module support being configured to limit insertion of the fan module into the duct inlet.

12. The mask apparatus according to claim 8, wherein the fan module comprises:

a fan housing that defines the fan outlet, the fan housing further defining a fan inlet configured to receive the external air; and a fan accommodated in the fan housing, and wherein the mask body comprises a fan module mounting portion disposed at the front surface of the mask body and configured to accommodate the fan module.

13. The mask apparatus according to claim 12, wherein the fan module mounting portion comprises:

a pair of fixing ribs that extend along the top surface portion and the bottom surface portion toward a side end of the mask body, the pair of fixing ribs being configured to support top and bottom surfaces of the fan housing, respectively; and a fan module coupling portion that protrudes from the front surface of the mask body and is disposed adjacent to a side end of each of the pair of fixing ribs, the fan module coupling portion being configured to receive a coupling member passing through an edge of the fan housing.

14. The mask apparatus according to claim 12, wherein the mask body cover comprises a filter mounting portion that defines an air suction hole at a rear side of the filter mounting portion, the air suction hole being configured to communicate with the fan inlet.

15. The mask apparatus according to claim 2, wherein the top surface portion of the air duct extends along a first virtual line that extends from an upper end of the side surface portion of the air duct toward the center axis, the first virtual line being inclined with respect to a second virtual line that extends horizontally from the upper end of the side surface portion of the air duct toward the center axis, and wherein an angle defined between the first virtual line and the second virtual line is in a range from 20 degrees to 40 degrees.

16. The mask apparatus according to claim 1, wherein the mask body defines an air discharge port at a lower portion of the mask body below the breathing space, the air discharge port being configured to discharge the air exhaled into the breathing space to an outside of the mask body, and wherein the air discharge port includes the air exhaust hole.

17. The mask apparatus according to claim 1, wherein the mask body comprises a hook mounting portion disposed at each of a left side and a right side of the mask body.

18. The mask apparatus according to claim 1, wherein the mask body defines a cover coupling groove along a front edge of the mask body, the cover coupling groove being configured to receive an edge of the mask body cover.

19. The mask apparatus according to claim 1, wherein the mask body comprises a plurality of cover coupling portions configured to couple to the mask body cover, the plurality of cover coupling portions comprising:

a pair of first cover coupling portions that are disposed at an upper portion of the front surface of the mask body and protrude forward relative to the front surface of the mask body; and a pair of second cover coupling portions that are disposed at a lower portion of the front surface of the mask body and protrude forward relative to the front surface of the mask body.

* * * * *